United States Patent
Krueger et al.

(10) Patent No.: US 10,890,058 B2
(45) Date of Patent: Jan. 12, 2021

(54) LOW-FREQUENCY DAS SNR IMPROVEMENT

(71) Applicant: CONOCOPHILLIPS COMPANY, Houston, TX (US)

(72) Inventors: Kyle R. Krueger, Houston, TX (US); Ge Jin, Houston, TX (US); Charles C. Mosher, Houston, TX (US); Herbert W. Swan, Houston, TX (US); Baishali Roy, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 226 days.

(21) Appl. No.: 15/453,584

(22) Filed: Mar. 8, 2017

(65) Prior Publication Data

US 2017/0342814 A1    Nov. 30, 2017

Related U.S. Application Data

(60) Provisional application No. 62/305,758, filed on Mar. 9, 2016, provisional application No. 62/305,777, filed on Mar. 9, 2016.

(51) Int. Cl.

| | |
|---|---|
| *E21B 43/17* | (2006.01) |
| *G01V 1/42* | (2006.01) |
| *G01V 1/30* | (2006.01) |
| *G01V 1/22* | (2006.01) |
| *G01H 9/00* | (2006.01) |

(Continued)

(52) U.S. Cl.
CPC ............. *E21B 43/17* (2013.01); *E21B 43/26* (2013.01); *E21B 47/113* (2020.05); *E21B 47/135* (2020.05); *G01H 9/004* (2013.01); *G01V 1/226* (2013.01); *G01V 1/30* (2013.01); *G01V 1/308* (2013.01); *G01V 1/42* (2013.01); *G01V 1/48* (2013.01); *G06T 17/05* (2013.01); *G01V 2210/1429* (2013.01); *G01V 2210/624* (2013.01)

(58) Field of Classification Search
CPC ........ E21B 43/17; E21B 47/102; G01H 9/004
See application file for complete search history.

(56) References Cited

U.S. PATENT DOCUMENTS

| | | |
|---|---|---|
| 3,981,187 A | 9/1976 | Howell |
| 4,676,664 A | 6/1987 | Anderson et al. |

(Continued)

FOREIGN PATENT DOCUMENTS

| | | |
|---|---|---|
| GB | 2492802 A | 1/2013 |
| WO | 2001048353 A1 | 7/2001 |

(Continued)

OTHER PUBLICATIONS

Boone, K., et al—"Monitoring Hydraulic Fracturing Operations Using Fiber-Optic Distributed Acoustic Sensing", 2015, Unconventional Resources Technology Conference, SPE-178648-MS/URTeC:2158449, Presented at the Unconventional Resources Technology Conference held in San Antonio, TX, USA Jul. 20-22, 2015, pp. 1-8; 8 pgs.

(Continued)

*Primary Examiner* — Mohamed Charioui
(74) *Attorney, Agent, or Firm* — ConocoPhillips Company

(57) ABSTRACT

A workflow using techniques for improving signal-to-noise ratio and decreasing interferences for Low-Frequency Distributed Acoustic Sensing is described.

14 Claims, 17 Drawing Sheets

(51) Int. Cl.

| | | |
|---|---|---|
| *E21B 47/113* | (2012.01) | |
| *E21B 47/135* | (2012.01) | |
| *E21B 43/26* | (2006.01) | |
| *G01V 1/48* | (2006.01) | |
| *G06T 17/05* | (2011.01) | |

(56) References Cited

U.S. PATENT DOCUMENTS

| | | | |
|---|---|---|---|
| 6,026,913 | A | 2/2000 | Mandal et al. |
| 6,176,323 | B1 | 1/2001 | Weirich et al. |
| 6,268,911 | B1 | 7/2001 | Tubel et al. |
| 6,778,720 | B1 | 8/2004 | Cekorich et al. |
| 7,055,604 | B2 | 6/2006 | Jee et al. |
| 7,668,411 | B2 | 2/2010 | Davies et al. |
| 8,505,625 | B2 | 8/2013 | Ravi et al. |
| 8,630,816 | B2 | 1/2014 | Park et al. |
| 8,646,968 | B2 | 2/2014 | MacDougall et al. |
| 8,930,143 | B2 | 1/2015 | Sierra et al. |
| 8,950,482 | B2 | 2/2015 | Hill et al. |
| 9,116,119 | B2 | 8/2015 | Le Floch |
| 9,273,548 | B2 | 3/2016 | LeBlanc et al. |
| 9,347,310 | B2 | 5/2016 | Unalmis et al. |
| 9,416,644 | B2 | 8/2016 | McEwen-King et al. |
| 9,464,512 | B2 | 10/2016 | Kalia et al. |
| 10,095,828 | B2 | 10/2018 | Swan et al. |
| 2002/0180728 | A1 | 12/2002 | Neff et al. |
| 2003/0205375 | A1 | 11/2003 | Wright et al. |
| 2006/0272809 | A1 | 12/2006 | Tubel et al. |
| 2008/0277568 | A1 | 11/2008 | Crickmore et al. |
| 2009/0114386 | A1 | 5/2009 | Hartog et al. |
| 2009/0194333 | A1 | 8/2009 | MacDonald |
| 2009/0326826 | A1 | 12/2009 | Hull et al. |
| 2010/0076738 | A1 | 3/2010 | Dean et al. |
| 2010/0200743 | A1 | 8/2010 | Forster et al. |
| 2010/0200744 | A1 | 8/2010 | Pearce et al. |
| 2010/0284250 | A1 | 11/2010 | Cornish et al. |
| 2011/0019178 | A1 | 1/2011 | Vlatas |
| 2011/0188347 | A1 | 8/2011 | Thiercelin et al. |
| 2011/0288843 | A1 | 11/2011 | Weng et al. |
| 2012/0017687 | A1 | 1/2012 | Davis et al. |
| 2012/0057432 | A1 | 3/2012 | Hill et al. |
| 2012/0067118 | A1 | 3/2012 | Hartog et al. |
| 2012/0092960 | A1* | 4/2012 | Gaston ............... E21B 47/101 367/35 |
| 2012/0133367 | A1 | 5/2012 | Bittar et al. |
| 2012/0147924 | A1 | 6/2012 | Hall |
| 2013/0023353 | A1 | 1/2013 | Wright |
| 2013/0032338 | A1 | 2/2013 | Kalia et al. |
| 2013/0211726 | A1 | 8/2013 | Mestayer et al. |
| 2013/0298635 | A1 | 11/2013 | Godfrey |
| 2013/0298665 | A1 | 11/2013 | Minchau |
| 2014/0036628 | A1 | 2/2014 | Hill et al. |
| 2014/0100274 | A1 | 4/2014 | Bobotas et al. |
| 2014/0110124 | A1 | 4/2014 | Goldner et al. |
| 2014/0126325 | A1 | 5/2014 | Farhadiroushan et al. |
| 2014/0163889 | A1 | 6/2014 | Finfer et al. |
| 2014/0180592 | A1 | 6/2014 | Ravi et al. |
| 2014/0202240 | A1 | 7/2014 | Skinner et al. |
| 2014/0216151 | A1 | 8/2014 | Godfrey |
| 2014/0246191 | A1 | 9/2014 | Zolezzi-Garreton |
| 2014/0260588 | A1 | 9/2014 | Jaaskelainen et al. |
| 2014/0290936 | A1 | 10/2014 | Wills et al. |
| 2014/0358444 | A1 | 12/2014 | Friehauf et al. |
| 2014/0365130 | A1 | 12/2014 | Woods |
| 2015/0000932 | A1 | 1/2015 | O'Brien |
| 2015/0014521 | A1 | 1/2015 | Barfoot |
| 2015/0057934 | A1 | 2/2015 | Ma et al. |
| 2015/0083405 | A1 | 3/2015 | Dobroskok et al. |
| 2015/0135819 | A1 | 5/2015 | Petrella et al. |
| 2015/0146759 | A1 | 5/2015 | Johnston |
| 2015/0159478 | A1 | 6/2015 | Georgi et al. |
| 2015/0331971 | A1 | 11/2015 | Scollard et al. |
| 2016/0003032 | A1 | 1/2016 | Grubb et al. |
| 2016/0138389 | A1 | 5/2016 | Stokely |
| 2016/0146962 | A1 | 5/2016 | Hayward |
| 2016/0265345 | A1 | 9/2016 | In't Panhuis et al. |
| 2016/0266276 | A1 | 9/2016 | Stokely et al. |
| 2016/0356125 | A1 | 12/2016 | Bello et al. |
| 2017/0045410 | A1 | 2/2017 | Crickmore et al. |
| 2017/0075005 | A1* | 3/2017 | Ranjan ............... G01V 1/303 |
| 2017/0075006 | A1 | 3/2017 | Dusterhoft et al. |
| 2017/0191363 | A1* | 7/2017 | Dickenson ............ E21B 47/102 |
| 2017/0205260 | A1 | 7/2017 | Jaaskelainen et al. |
| 2017/0260839 | A1 | 9/2017 | Beardmore et al. |
| 2017/0260842 | A1 | 9/2017 | Jin et al. |
| 2017/0260846 | A1 | 9/2017 | Jin et al. |
| 2017/0260849 | A1 | 9/2017 | Friehauf et al. |
| 2017/0260854 | A1 | 9/2017 | Jin et al. |
| 2017/0328181 | A1 | 11/2017 | Kristjansson et al. |
| 2017/0342814 | A1 | 11/2017 | Krueger et al. |
| 2018/0016890 | A1 | 1/2018 | Friehauf |
| 2018/0045040 | A1 | 2/2018 | Swan et al. |
| 2018/0217285 | A1 | 8/2018 | Walters et al. |
| 2018/0230049 | A1 | 8/2018 | Wysocki et al. |
| 2018/0348389 | A1* | 12/2018 | Jaaskelainen ....... E21B 41/0035 |

FOREIGN PATENT DOCUMENTS

| | | |
|---|---|---|
| WO | 2013092906 A2 | 6/2013 |
| WO | 20140201316 A1 | 12/2014 |
| WO | 2015065869 A1 | 5/2015 |
| WO | 2015076976 A1 | 5/2015 |
| WO | 2015094180 A1 | 6/2015 |
| WO | 2015107332 A1 | 7/2015 |
| WO | 20150170113 A1 | 11/2015 |
| WO | 20150187140 A1 | 12/2015 |
| WO | 20150187149 A1 | 12/2015 |
| WO | 20160007161 A1 | 1/2016 |
| WO | 2016069322 A1 | 5/2016 |
| WO | 2017027340 A1 | 2/2017 |
| WO | 2017039605 A1 | 3/2017 |
| WO | 2017156339 A1 | 9/2017 |
| WO | 2018204920 A1 | 11/2018 |

OTHER PUBLICATIONS

Webster, P., et al—"Developments in Diagnostic Tools for Hydraulic Fracture Geometry Analysis", 2013, Unconventional Resources Technology Conferene (URTeC), Denver, Colorado, Aug. 12-14, 2013, SPE 168933/URTec 1619968, pp. 1-7; 7 pgs.

Paleja, Rakesh, et al—"Velocity Tracking for Flow Monitoring and Production Profiling Using Distributed Acoustic Sensing", 2015, Society of Petroleum Engineers, SPE-174823-MS, Presented at the SPE Annual Technical Conference and Exhibition held in Houston, TX USA Sep. 28-30, 2015, pp. 1-16; 16 pgs.

Awada, A., et al. "Is that interference? A work flow for identifying and analyzing communication through hydraulic fractures in a multiwell pad," SPE Journal, vol. 21, No. 5, pp. 13 (Oct. 2016).

Becker, M.B., et al., "Measuring Hydralic Connection in Fractured Bedrock with Periodic Hydraulic Tests and Distributed Acoustic Sensing," Juounal of Hydrology, pp. 1-11 (Feb. 22-24, 2016).

Boman, K, "Das technology expands fiber optic applications for oil, gas industry," Rigzone, (May 4, 2015) issue http://www.rigzone.com/news/oil_gas/a/138405/DAS_Technology_Expands_FiberOptic_Applications_for_Oil_Gas_Industry, pp. 4.

European Search Report for European Application No. EP 17764137.0 dated Mar. 6, 2019.

European Search Report for European Application No. EP 17764143.8 dated Mar. 4, 2019.

European Search Report for European Application No. EP 177641503 dated Mar. 4, 2019.

European Search Report for European Application No. EP 17764151.1 dated Mar. 4, 2019.

European Search Report for European Application No. EP17764146.1 dated Mar. 14, 2019.

Grayson, S., et al., "Monitoring acid stimulation treatments in naturally fractured reservoirs with slickline distributed temperature sensing," Society of Petroleum Engineers, pp. 17, (Jan. 2015).

International Search Report with Written Opinion for International Application No. PCT/US2017/021659 dated Jun. 1, 2017, pp. 7.

(56) References Cited

OTHER PUBLICATIONS

International Search Report with written opinion dated Jun. 1, 2017 for International Application No. PCT/ US2017/021667, pp. 8.
International Search Report with Written Opinion for International Application No. PCT/US2017/021674 dated May 25, 2017, pp. 10.
International Search Report with Written Opinion for International Application No. PCT/US2017/021678 dated Jun. 1, 2017, pp. 7.
International Search Report with Written Opinion for International Application No. PCT/US2017/021679 dated May 25, 2017, pp. 7.
International Search Report with Written Opinion for International Application No. PCT/US2017/021681 dated May 22, 2017, pp. 10.
International Search Report with Written Opinion for International Application No. PCT/US2017/21670 dated May 25, 2017, pp. 6.
International Search Report with Written Opinion for International Application No. PCT/US2018/031404 dated Jul. 13, 2018, pp. 15.
International Search Report with Written Opinion for International Application No. PCT/US2018/056327 dated Dec. 21, 2018, pp. 12.
International Search Report with Written Opinion for International Application No. PCT/US2019/030408 dated Jul. 22, 2019, pp. 9.
Jin, G., and Roy, B., "Hydraulic-fracture geometry characterization using low-frequency DAS signal," The Leading Edge, vol. 36, No. 12, pp. 962-1044 (Dec. 2017).
Johannessen, K., et al. "Distributed Acoustic Sensing—a new way of listening to your well/reservoir," Society of Petroleum Engineers, Society of Petroleum Engineers, pp. 1-9 (Mar. 27-29, 2012).
Le Calvez, J. H., et al. "Real-time microseismic monitoring of hydraulic fracture treatment: a tool to improve completion and reservoir management," Society of Petroleum Engineers, pp. 7 (Jan. 2007).
Lord, D.L., "Study of Performation Friction Pressure Employing a Loarge-Scale Fracturing Flow Simulator," SPE Annual technical Conference and Exhibition, pp. 10 (Sep. 25, 1994).
McKinley, R.M., et al., "Specialized Applications of Noise Logging," Journal of Petroleum Technology, vol. 31, Issue 11, pp. 1387-1395 (Nov. 1979).
Mckinley, R.M., et al., "The Structure and Interpretation of Noise From Flow Behind Cemented Casing," Journal of Petroleum Technology, vol. 25, No. 3, pp. 329-338 (Mar. 1973).
Molenaar, M., et al, "First Downhole Application of Distributed Acoustic Sensing (DAS) for Hydraulic Fracturing Monitoring and Diagnostics," Society of Petroleum Engineers, vol. 27, No. 1, pp. 32-38 (Mar. 2012).
Molenaar, M.M., et al., "Real-Time Downhole Monitoring of Hydraulic Fracturing Treatments Using Fibre Optic Distributed Temperature and Acoustic Sensing," Society of Petroleum Engineers, pp. 13 (2012).
European Search Report for European Application No. EP18794756.9 dated Apr. 14, 2020.
Bukhamsin, A., et al., Cointerpretation of distributed acoustic and temperature sensing for improved smart well inflowprofiling. In SPE 180465-MS, Western Regional Meeting. Society of Petroleum Engineers (2016).
Byrd, R. H., et al., A limited memory algorithm for bound constrained optimization. SIAM Journal on Scientific Computing, 16 (5), 1190-1208 (1995).
Curtis, M., et al. (1973). Use of the temperature log for determining flow rates in producing wells. In Fall Meeting of theSociety of Petroleum Engineers of AIME. Society of Petroleum Engineers 4637 (1973).
Dakin, J., Distributed optical fibre Raman temperature sensor using a semiconductor light source and detector. Electronics letters, 21 (13), 569-570 (1985).

Ouyang, L.-B., Flow profiling by distributed temperature sensor (DTS) system-expectation and reality. SPE Production& Operations, 21 (02), 269-281 (2006).
Ramey Jr, H., et al., Wellbore heat transmission. Journal of Petroleum Technology, 14 (04), 427-435 (1962).
Van der Horst, et al., Fiber optic sensing for improved wellbore production surveillance. In IPTC 2014: InternationalPetroleum Technology Conference (2014).
Vu-Hoang, D., et al., A novel approach to production logging in multiphase horizontal wells. In SPE 89848, AnnualTechnical Conference and Exhibition. Society of Petroleum Engineers (2004).
Rector, J.W., et al—"The Use of an Active Drill Bit for Inverse VSP Measurements", 2018, Exploration Geophysics, vol. 20, Issue 1-2, Abstract only, 5 pgs.
URTEC-2670034-MS (2017) Raterman K.Y., et al., Sampling a Stimulated Rock Volume: An Eagle Ford Example.
SPE-168610-MS (2014)-Holley, E.H., et al. "Using Distributed Optical Sensing to Constrain Fracture Models andConfirm Reservoir Coverage in Permian Basin." SPE Hydraulic Fracturing Technology Conference, The Woodlands,Texas, U.S.A., Feb. 4-6.
SPE-153131-PA(2013)-Holley, E.H., et al., "Interpreting Uncemented Multistage Hydraulic-Fracturing aompletionEffectiveness by Use of Fiber-Optic DTS Injection Data." SPE Drilling & Completion, 28(3): 243-253.
SPE-107775-PA (2009)-Glasbergen G., et al. "Real-Time Fluid Distribution Determination in Matrix TreatmentsUsing DTS", Society of Petroleum Engineers.
SPE-116182-MS(2008)—Sierra J.R., et al., "DTS Monitoring of Hydraulic Fracturing: Experiences and Lessonseamed", Society of Petroleum Engineers.
SPE-107854-MS (2007)-Tardy, et al., "An Experimentally Validated Wormhole Model for Self-Diverting and: onventional Acids in Carbonate Rocks Under Radial Flow Conditions", Society of Petroleum Engineers.
Ribeiro et al., Detecting Fracture Growth Out of Zone Using Temperature Analysis, Oct. 27-29, 2014, SPE-1707 46-MS, SPEAnnual Technical Conference and Exhibition, Amsterdam, The Netherlands, 24 pp. (Year: 2014).
Hesthammer, J et al. "From seismic data to core data: an integrated approach to enhancereservoir aharacterization"; 2003; Geological Society, London, Special Publications, 209, pp. 39-54.
Optasense, "Pipeline Integrity Management: Leak Detection," accessed at https://ace-control.com.sg/wp-content/ uploads/2018/11/Pipeline-Integrity-Management-Leak-Detection.pdf, accessed on Jun. 10, 2019, pp. 5.
Ouyang, L-B., et al. "Flow profiling via distributed temperature sensor (DTS) system-expectation and reality," Society of Petroleum Engineers, pp. 14 (2004).
Portis, D. H., et al., "Searching for the optimal well spacing in the eagle ford shale: A practical tool-kit," Unconventional Resources Technology Conference, pp. 8 (Aug. 12-14, 2013).
Sellwood S.M., et al., "An in-well heat-tracer-test method for evaluating borehole flow conditions," Hydrogeology Journal, Springer, vol. 23, No. 8, pp. 1817-1830 (Aug. 29, 2015).
Webster, P., et al. "Micro-Seismic detection using distributed acoustic sensing," society of Exploration Geophysicists, pp. 5 (Aug. 19, 2013).
Wheaton, B., et al. "A case study of completion effectiveness in the eagle ford shale using DAS/DTS observations and hydraulic fracture modeling," Society of Petroleum Engineers, pp. 11 (2016).
Wu, K, et al. "Mechanism analysis of well interference in unconventional reservoirs: Insights from fracture-geometry simulation between two horizontal wells," Society of Petroleum Engineers, vol. 33, No. 1, pp. 9 (Feb. 2018).

* cited by examiner

LOW-FREQUENCY DAS SNR IMPROVEMENT

PRIOR RELATED APPLICATIONS

This application is a non-provisional application which claims benefit under 35 USC § 119(e) to U.S. Provisional Application Ser. No. 62/305,758 filed Mar. 9, 2016, entitled "LOW FREQUENCY DISTRIBUTED ACOUSTIC SENSING," and Ser. No. 62/305,777 filed Mar. 9, 2016, entitled "PRODUCTION LOGS FROM DISTRIBUTED ACOUSTIC SENSORS," each of which is incorporated herein in its entirety.

FIELD OF THE DISCLOSURE

The disclosure relates to well logging techniques used in oil and gas recovery operations. In particular, a workflow utilizing methods of improving signal-to-noise ratio and decreasing interferences for Low-Frequency Distributed Acoustic Sensing is described.

BACKGROUND OF THE DISCLOSURE

For hydrocarbon recovery, accurate production monitoring of the pathways between the wellbore and the reservoir are required for the economic optimization of the techniques and procedures used to complete wells. In the development of oil and gas and other similar wells, it is often necessary to utilize well logging surveys to determine the fraction of oil, gas and unwanted water present in the production zone. This data, along with measurements of the fluid flow velocity, porosity, cross-section of the well, pressure and temperature, may be used to determine production rates and other information from each zone of interest in the well. Such data may be useful for optimizing the well's production, oil recovery, water shut-off and/or fracturing sequence, in order to achieve better reservoir management and to reduce intervention costs.

Well logging surveys are performed using logging tools that generally comprise at least one sensor and measure at least one parameter. Logging tools have included spinner type flow meters with attached temperature sensors, which rotate when immersed within a flow stream. However, this type of logging tool has had issues with mechanical effectiveness. For example, the impeller of the spinner operates on a bearing, which wears and requires frequent inspection and replacement to keep frictional effects from influencing the measurements. Another disadvantage, which increases logging time on the well, is that calibration must be done downhole by making several extra logging runs at various logging speeds. In reference to the fluid properties, the spinner speed is not only affected by changes in the velocity of the fluid, but also by changes in the viscosity and density of the fluid.

Optical fibers have been used in a variety of logging tools. One technique for substantially instantaneous measurement is fiber optic Distributed Temperature Sensing (DTS) technology. DTS typical includes an optical fiber disposed in the wellbore (e.g. via a permanent fiber optic line cemented in the casing, a fiber optic line deployed using a coiled tubing, or a slickline unit). The optical fiber measures a temperature distribution along a length thereof based on an optical time-domain (e.g. optical time-domain reflectometry (OTDR), which is used extensively in the telecommunication industry).

One advantage of DTS technology is the ability to acquire, in a short time interval, the temperature distribution along the well without having to move the sensor as in traditional well logging, which can be time consuming. DTS technology effectively provides a "snap shot" of the temperature profile along the whole length of a well. DTS technology has been utilized to measure temperature changes in a wellbore after a stimulation injection, from which a flow distribution of an injected fluid can be qualitatively estimated. The inference of flow distribution is typically based on magnitude of temperature "warm-back" during a shut-in period after injecting a fluid into the wellbore and surrounding portions of the formation. The injected fluid is typically colder than the formation temperature and a formation layer that receives a greater fluid flow rate during the injection has a longer "warm back" time compared to a layer or zone of the formation that receives relatively less flow of the fluid.

Unfortunately, the spatial and temporal resolution of DTS measurements is lacking. As DTS spatially averages temperature over approximately 1 meter lengths, it fails to provide precise measurements of the inflow temperature of produced fluids. Further, current DTS interpretation techniques and methods are based on visualization of the temperature change in the DTS data log, and are qualitative in nature, at best.

What is needed in the art are methods of improved well logging for all aspects of oil and gas production. Although well logging is quite successful, even incremental improvements in technology can mean the difference between cost effective production and reserves that are uneconomical to produce. Ideally, the improved methods would have high spatial and temporal resolution while retaining the ability to provide 'snap shots' of the production zone's fluid allocation.

SUMMARY OF THE DISCLOSURE

Described herein are workflows and methods for removing and/or mitigating the effects of common noise sources and signal interferences encountered in Low-Frequency Distributed Acoustic Sensing (DAS).

DAS has been used to monitor various facets of the hydraulic fracturing operation, including injection fluid allocation (e.g. Broone et al. 2015), hydraulic fracture detection (e.g. Webster et al. 2013), and production allocation (e.g. Paleja et al. 2015). However, these applications focus on the DAS signals that are in high frequency bands (>1 Hz), and some applications only use the "intensity" of the signal (waterfall plot), which is obtained through a root mean square (RMS) averaging operation. Further, the RMS intensity plot does not contain polarity information that is critical for the signal interpretation. High-frequency signal also lacks the polarity information, hence the use of low-pass filtering.

Low-frequency (below 1 Hz) DAS (LF-DAS) acquisitions have shown promise in low rate, minimal gas, unconventional wells for production logging, as well as in cross-well monitoring of completions during hydraulic fracturing operations. Such applications of low-frequency DAS are described in 62/305,758 filed Mar. 9, 2016, entitled "Low Frequency Distributed Acoustic Sensing," and Ser. No. 62/305,777 filed Mar. 9, 2016, entitled "Production Logs from Distributed Acoustic Sensors," incorporated by reference in its entirety for all purposes.

Specifically, fiber optic cables deployed in the stimulation well and/or at one or more observation wells act as the sensing element for DAS signals in the low frequency band of greater than 0 to 0.05 Hz (50 millihertz or mHz). The low frequency band is used because the resulting data contains polarity information. The low frequency band DAS signals are recorded and used to estimate stimulation parameters, including hydraulic fracture growth and geometry, isolation conditions between stages, and other key factors that determine fracture efficiency. The signals can also be used to diagnose potential completion or fracturing issues that may affect the production phase.

DAS is the measure of Rayleigh scatter distributed along the fiber optic cable. In use, a coherent laser pulse from an interrogator is sent along the optic fiber and scattering sites within the fiber itself causes the fiber to act as a distributed interferometer with a pre-set gauge length. Thus, interactions between the light and material of the fiber can cause a small amount of light to backscatter and return to the input end, where it is detected and analyzed. Acoustic waves, when interacting with the materials that comprise the optical fiber, create small changes in the refractive index of the fiber optic cable. These changes affect the backscatter characteristics, thus becoming detectable events. Using time-domain techniques, event location is precisely determined, providing fully distributed sensing with resolution of 1 meter or less.

The intensity and phase of the reflected light is measured as a function of time after transmission of the laser pulse. When the pulse has had time to travel the full length of the fiber and back, the next laser pulse can be sent along the fiber. Changes in the reflected intensity and phase of successive pulses from the same region of fiber are caused by changes in the optical path length of that section of fiber. This type of system is very sensitive to both strain and temperature variations of the fiber and measurements can be made almost simultaneously at all sections of the fiber.

However, different DAS applications and environments have unique characteristics that can create challenges in data analysis, especially when collecting low-frequency data. For example, there is almost always spike noise present resulting from phase errors in the interrogator. In some applications, there is an extremely low-frequency (<1 mHz) drift signal that affects all channels of the DAS interrogator and can be of greater strength (e.g. intensity) than the signal of interest.

Installation issues can also lead to interference. If the fiber optic cable used in DAS sensing is not directly coupled to the borehole, as is the case for in temporary installations, there can be noise associated with vibrations in the fiber casing. The vibration noise can be orders of magnitude higher than the signal of interest, thus effectively masking the signals. In thermal sensing applications, significant thermal dissipation, depending on material properties between the fluid and the fiber itself, can be exhibited.

Depending on the DAS application, installation and material effects, all or some of these interferences can affect the data sensing and/or acquisition. This leads to inaccurate results, time-consuming delays in operation to gather additional data and/or extended analysis time by the operator, and costly mistakes.

Thus, a new DAS processing workflow was designed to accurately "denoise" low-frequency DAS data for analysis in varied environments and applications. The workflow determines which interferences or noise source is present, and applies one or more correction techniques to mitigate or remove the interferences and/or noise from the acquired data. This allows for selective modulation based on the characteristics present instead of a universal application of all techniques. In turn, the selective modulation reduces the time needed for correction of the acquisition data and speeds analysis.

The ability to acquire and process good quality low-frequency DAS data has been found to provide critical information for completions efficiency and well spacing and stacking criteria. Specifically, low-frequency DAS inwell and crosswell data, collected during both hydraulic stimulation and production, have provided spatial information along entire wellbore and the interwell spacing that is differential and innovative. Having higher quality data allows for more robust analysis techniques to be used, and provides a higher level of confidence in the analyzed results. Further, quality low-frequency DAS measurements have been shown to have much higher spatial and temporal resolution than Distributed temperature sensing (DTS) measurements alone (Co-pending application "Measuring Downhole Temperature by Combining DAS/DTS Data", filed Mar. 8, 2017).

The advantages of this workflow are that it allows for the low-frequency DAS measurements to be acquired by a temporarily or permanently installed fiber in a wellbore. By correcting the signal and interferences issues, the LF-DAS information can be used in conjunction with DTS measurements, pressure gauge data, microseismic, and other relevant data for production and completion analysis.

The ability to correct signals for temporary fibers is important as they are widely used. Temporarily installed fibers' signal suffer from not being directly coupled to the borehole in some sections, and the resulting noise caused by the vibration of the fiber casing masks the signals of interest. Using the below described workflow, the signal-to-noise ratio will be comparable to permanently installed fibers that have a much lower background noise level. Further, the ability to analyze data from a permanently installed fiber and a temporarily installed fiber with the same degree of quality and confidence increased probability of application and adoption of a new technology particularly in a cost-constrained environment.

Another advantage of the workflow is that DAS data for certain analysis, such as production logging, are very challenging without noise removal techniques because of inherent low signal strength. Production crosswell signals are up to three orders of magnitude smaller than completion crosswell signals and are thus under the noise floor created by the drift. Removing the drift is imperative to being able to complete this analysis.

In more detail, the workflow allows for the correction of noise and interference issues in DAS data by the use of various techniques. The workflow can put the low-frequency DAS measurements through a series of filtering and other signal processing operations to reduce noise and enhance the signal. Some of these techniques are established seismic signal processing techniques such as: median filtering, envelope soft limiting, FK filtering, and amplitude gain control. The adoption and parameterization of these seismic signal-processing methods for low-frequency DAS significantly improves the quality of the DAS data used for interpretation and decision-making. In another embodiment, LF-DAS data SNR enhancement techniques include drift removal, thermal recoupling, and dynamic fluid correction.

For instance, median filtering can be used to remove impulse noise; signal isolation and inversion can remove low frequency signal drift; envelope soft thresholding and FK-filtering can remove vibrations from fiber housing; thermal recoupling can mitigate temperature diffusion that happens in the material between the fluid and fiber; dynamic fluid control can correct for unaccounted for thermal effects like dissipation and effects from fluid mixing; and, automatic gain control can be applied if the amplitude variation of the signal is not needed for the analysis.

The invention includes any one or more of the following embodiment(s) in any combination(s) thereof:

A method of optimizing production of a hydrocarbon-containing reservoir comprising:
collecting Low-Frequency Distributed Acoustic Sensing (LF-DAS) data from at least one well in a hydrocarbon-containing reservoir;
applying at least one processing technique to said LF-DAS data to form a corrected data set;
analyzing said corrected data set; and,
optimizing a production plan for producing hydrocarbons from said reservoir based on said analysis; and
implementing said optimized production plan to produce hydrocarbons.

A method of optimizing the production of a hydrocarbon-containing reservoir comprising:
collecting Low-Frequency Distributed Acoustic Sensing (LF-DAS) data from at least one well in a hydrocarbon-containing reservoir;
applying at least one processing technique to said LF-DAS data to form a corrected data set, wherein said processing technique is selected from a group comprising median filtering, drift removal, envelope soft limiting, FK filtering, thermal decoupling, dynamic fluid correction, temporal derivatives, and/or amplitude gain control;
analyzing said corrected data set; and,
optimizing production of hydrocarbon from said reservoir based on said analysis.

A method of optimizing production from a hydrocarbon-containing reservoir comprising:
installing one or more fiber optic cables in at least one wellbore in a hydrocarbon-containing reservoir;
attaching said fiber optic cables to an interrogator having interrogation recording functions;
producing hydrocarbon from a target zone in said at least one wellbore using a predetermined parameters of a production scheme;
collecting Low-Frequency Distributed Acoustic Sensing (LF-DAS) data from at least one wellbore;
interrogating at least one fiber optic cable with an interrogation signal during said performing step;
recording one or more LF-DAS datasets;
applying at least one processing technique to said LF-DAS datasets to form a corrected dataset;
interpreting the corrected dataset to provide an interpreted record;
optimizing said predetermined parameters of said production scheme using said interpreted record to provide optimized parameters; and,
using said optimized parameters for producing hydrocarbon from a subsequent zone of said wellbore.

A method of optimizing a hydraulic fracturing stimulation of a reservoir comprising:
installing one or more fiber optic cables in at least one wellbore;
attaching said fiber optic cables to an interrogator having interrogation and reflection recording functions;
fracturing a stage of a multistage hydraulic fracturing stimulation in a reservoir using pre-determined parameters;
interrogating at least one fiber optic cable with an interrogation signal during said performing step;
recording one or more reflected datasets;
applying at least one processing technique to said LF-DAS data to form a corrected data set;
interpreting the corrected data set to provide an interpreted record;
optimizing said pre-determined parameters of said hydraulic fracturing stimulation using said interpreted record to provide optimized parameters; and,
using said optimized parameters for fracturing a subsequent stage in said reservoir.

The processing techniques used may include median filtering, drift removal, envelope soft limiting, FK filtering, thermal decoupling, dynamic fluid correction, temporal derivatives, and/or amplitude gain control.

The corrected data set may be analyzed in combination with at least one of distributed temperature sensor (DTS) measurements, pressure gauge data, and/or microseismic data.

Fiber optic cables may consist of temporarily installed fiber optic cables, permanently installed fiber optic cables, and combinations thereof.

Any method described herein, including the further step of printing, displaying or saving the results of the workflow.

Any method described herein, further including the step of using said results in a reservoir modeling program to predict reservoir performance characteristics, such as fracturing, production rates, total production levels, rock failures, faults, wellbore failure, and the like.

Any method described herein, further including the step of using said results to design and implement a hydraulic fracturing program, any enhanced oil recovery program, or a production plan.

A non-transitory machine-readable storage medium, which when executed by at least one processor of a computer, performs the steps of the method(s) described herein.

Hardware for implementing the inventive methods may preferably include massively parallel and distributed Linux clusters, which utilize both CPU and GPU architectures. Alternatively, the hardware may use a LINUX OS, XML universal interface run with supercomputing facilities provided by Linux Networx, including the next-generation Clusterworx Advanced cluster management system. Another system is the Microsoft Windows 7 Enterprise or Ultimate Edition (64-bit, SP1) with Dual quad-core or hex-core processor, 64 GB RAM memory with Fast rotational speed hard disk (10,000-15,000 rpm) or solid state drive (300 GB) with NVIDIA Quadro K5000 graphics card and multiple high resolution monitors. Slower systems could also be used, because the processing is less compute intensive than for example, 3D seismic processing.

This summary is provided to introduce a selection of concepts that are further described below in the detailed description. This summary is not intended to identify key or essential features of the claimed subject matter, nor is it intended to be used as an aid in limiting the scope of the claimed subject matter.

"Interferences" is used broadly herein to denote anything that affects the signal of the DAS measurements. This can include vibration, surface noise, seismic noise sources, drifts, and other signal interference mechanisms.

As used herein, the term "interrogator" refers to an electronic device that transmits a signal, in this case a laser pulse through a fiber optic cable, to obtain a response (i.e. Rayleigh Scattering) that is typically recorded. Measurements of background noise are usually taken to determine baseline for the signal and can be subtracted out for improved signal intensity.

Any interrogator can be used to collect the LF-DAS data, In some cases two or more interrogators may be used in parallel, one to collect "noise"/high-frequency DAS and a second interrogator to collect temperature rate of change/low-frequency DAS.

As used herein, the term "inwell" refers to measuring DAS data in the well of interest.

As used herein, the term "crosswell" refers to measuring DAS data in a monitoring well, and imputing the data to the well of interest.

As used herein, the term "spike noise" refers to a random bursts of noise in the acquired data.

As used herein, the term "semblance analysis" or "semblance function" refers to a process used in the refinement and study of seismic data to greatly increase the resolution of the data despite the presence of background noise.

As used herein, the term "thermal signal moveouts" refers to the velocity of the temperature signal.

As used herein, the term "FK filter" refers to a two-dimensional Fourier transform over time and space where F is the frequency (Fourier transform over time) and K refers to wave-number (Fourier transform over space).

As used herein, the term "joint inversion" uses one data as a priory constraint in the inversion of other data. More sophisticated approaches include all data sets (in general two, three, or more) in a single inverse algorithm.

As used herein, "drift removal" or "removing baseline drift" refers to correcting for a slow shifting of the baseline of the data. The low-frequency drift can be handled in two ways, depending on the type of signal being detected. If the desired low frequency DAS signal is temperature based and an independent temperature measurement is used, such as a distributed temperature sensor (DTS) which is commonly acquired simultaneously with DAS, then a joint inversion can remove the drift (as described in copending application Copending application, entitled "Temperature measurement by combining DAS/DTS data," filed Mar. 8, 2017). If the signal is not temperature based, or it is temperature based however there is not an accurate independent measurement of absolute temperature, then we search for a section of channels of the fiber at a single time that is determined to have a nonexistent, or low, signal strength. Once the quiet section is determined for each time sample, the median of the designated channels can be used to extract a time dependent drift function which can then be subtracted from all channels at each time to remove the drift.

$$DRIFT(t) = MED_x(x_q, t)$$

$x_q$ is a set of quiet depth channels, t is time, $MED_x$ is a median calculation of just the channel dimension, and DRIFT(t) is the time dependent drift calculation for each time sample, t. An example of drift removal done by (1) can be seen in a crosswell injection example shown in FIG. 1. The amplitude of the drift, as seen in FIG. 1 (D), is higher amplitude than a large portion of the underlying signal, seen in FIG. 1 (C). A second example of the impact of the low-frequency drift can be seen in FIG. 2, an example of a crosswell production signal. FIG. 2 (A) has no indication that any signal is present, only the low frequency drift. Once the drift is removed, FIG. 2(B), the important signal can be seen and analyzed.

As used herein the term "median filter" refers to a nonlinear digital filtering technique, often used to remove noise. The main idea of the median filter is to run through the signal entry by entry, replacing each entry with the median of neighboring entries. The pattern of neighbors is called the "window", which slides, entry by entry, over the entire signal. For 1D signals, the most obvious window is just the first few preceding and following entries, whereas for 2D (or higher-dimensional) signals such as images, more complex window patterns are possible (such as "box" or "cross" patterns). Note that if the window has an odd number of entries, then the median is simple to define: it is just the middle value after all the entries in the window are sorted numerically. For an even number of entries, there is more than one possible median, see median for more details.

As used herein, a "passband filter" refers to a device that passes frequencies within a certain range and rejects (attenuates) frequencies outside that range.

As used herein, "envelope soft limiting techniques" refers to setting an amplitude range in the signal envelope, $x_1 > x_2 > 0$, where $x_{max} > x_2$, with $x_{max}$ being the maximum envelope value in the investigation range. An individual envelope value $e_i$ is replaced if $x_{max} \geq e_i > x_2$ such that $$\tilde{e}_i = \frac{e_i - x_2}{x_{max} - x_2}(x_1 - x_2) + x_2.$$

As used herein, "thermal recoupling" refers to the removal of the temperature diffusion effect caused by the sensor not being in direct contact with the measurement medium.

As used herein, "semblance techniques" refers to a calculated velocity measurement as used in U.S. Ser. No. 62/305,777 filed Mar. 9, 2016, entitled "PRODUCTION LOGS FROM DISTRIBUTED ACOUSTIC SENSORS. SNR increases calculated semblance accuracy.

As used herein, "diffusivity settings" refers to the thermal properties of the material between the measurement medium and the sensor.

As used herein, "automatic gain control" refers to a technique used to keep the signal amplitude over a particular window roughly constant so that amplitude variations do not bias the analysis.

The use of the word "a" or "an" when used in conjunction with the term "comprising" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim.

The phrase "consisting of" is closed, and excludes all additional elements.

The phrase "consisting essentially of" excludes additional material elements, but allows the inclusions of non-material elements that do not substantially change the nature of the invention.

The following abbreviations are used herein:

| ABBREVIATION | TERM |
|---|---|
| SNR | Signal-to-noise |
| DAS | Distributed Acoustic Sensing |
| DTS | Distributed Temperature Sensing |
| AGC | automatic gain control |
| LF | Low Frequency |
| LF-DAS | Low Frequency-DAS |
| FK | Frequency - Wave Number Fourier Transform |

DESCRIPTION OF EMBODIMENTS OF THE DISCLOSURE

Figure 1A:
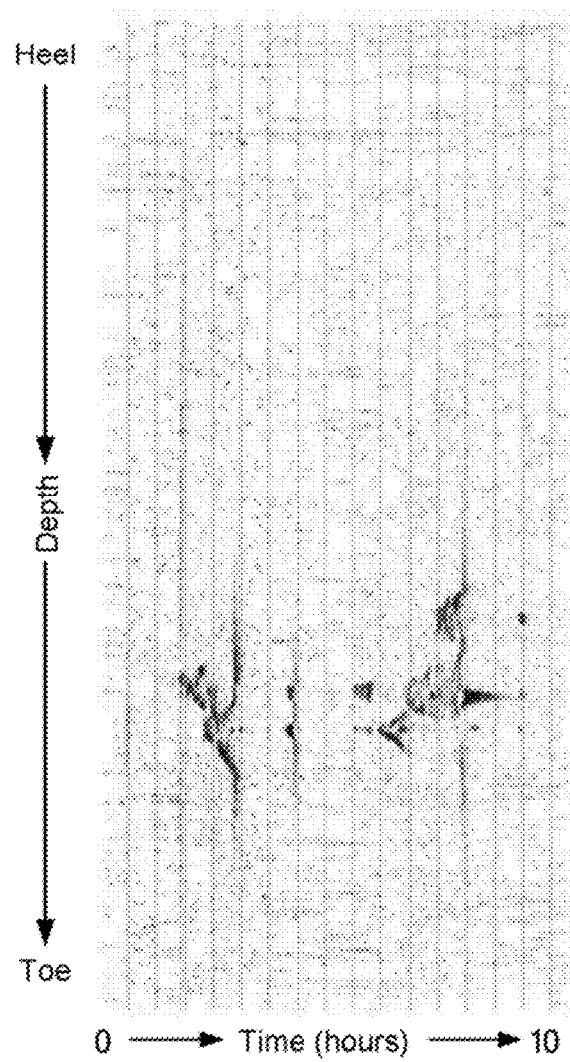
FIG. 1A displays raw LF-DAS data from a crosswell injection.

Low-Frequency DAS acquisitions have shown promise as a well logging technique with high spatial and temporal resolution for all aspects of oil and gas production. However, the data has a series of noise sources and signal interference mechanisms that can hinder analysis and affect decision-making. These interferences include spike noise, which are often associated with phase errors in the interrogator, low-frequency drift, vibrations in fiber housing, thermal recoupling and artifacts created from filtering techniques. Thus, improvements to the data are needed to facilitate optimization of development and production plans and reduce costs and errors.

Unfortunately, the significantly low SNR present in low-frequency DAS acquisitions can make analysis much more difficult or impossible. The described workflow uses a series of signal processing techniques for specific types of low-frequency DAS analysis. This allows for selective application of the techniques based on the interferences experienced during the acquisition.

The invention provides a novel workflow that allows for low-frequency DAS measurements to have its signal-to-noise ratio (SNR) increased prior to analysis by mitigating the effects of the various interferences. The improved SNR will facilitate better analysis, improved ability to combine DAS with other techniques, and better decision-making. This, in turn, reduces costs and errors.

In one embodiment, the workflow entails: spike noise reduction with 2D median filtering; low frequency drift is removed with either a joint inversion with DTS or a time dependent drift from a "quiet" section of the DAS signal may be used to remove drift; vibration noise is removed using velocity separability done with an FK-filter; artifacts such as phase error impulse spikes may require an envelope soft limit must be used to threshold high amplitude noise; for measurements outside the desired area temperature diffusion effect may be removed by thermal recoupling; thermal loss, mixing, and interaction as one or more fluids travel through the wellbore may be approximated by dynamic fluid correction; a derivative in the time dimension may be used to increase temporal resolution of the temperature signals; and finally—where amplitude is not relevant—an automatic gain control may be applied to improve semblance.

In another embodiment, the workflow provides a series of SNR techniques for a completion:
A) Obtain a "raw" LF-DAS signal;
B) If spike noise is present, perform 2D Median filtering;
C) If LF drift is present
 a. If temperature based, remove with DAS/DTS Joint Inversion; or
 b. If it is not temperature based or if no DTS is available, remove with signal exclusion; and
D) Provide signal for completion.

In another embodiment, the workflow provides a series of SNR techniques for production:
A) Obtain a "raw" LF-DAS signal;
B) If spike noise is present, perform 2D Median filtering;
C) If LF drift is present
 a. If temperature based, remove with DAS/DTS Joint Inversion; or
 b. If it is not temperature based or if no DTS is available, remove with signal exclusion;
D) If fiber vibration noise is present, Envelope soft limit and FK-Filter;
E) Thermal recouple; and
F) Provide signal for production.

If available, dynamic fluid correction may be used to correlate current data with experimental data under similar conditions. If higher resolution is required and noise levels are low, a time derivative may be used to increase temporal resolution. Finally, an automatic gain control may be applied.

The signal processing techniques applied by the presently disclosed workflow include, median filter, drift removal, envelope soft limiting, FK-filtering, thermal recoupling, joint inversion, dynamic fluid correction, and automatic gain control. Some of these techniques are commonly used in seismic data processing. However, they have been modified for use with the low-frequency DAS. The DAS measurements of concern are generally acquired from permanent installations in the cement surrounding a wellbore as well as temporary installations, such as carbon rod encased fiber. The present workflow can be applied to DAS inwell and crosswell completion monitoring, inwell production profiling, and crosswell production interference monitoring.

Further, because of the improved DAS data after application of the workflow, combination of the corrected data with DTS measurements, pressure gauge data, microseismic, and other relevant data for production and completion analysis are possible.

Further, the application of each technique may be performed in specific sequences to remove different noise signals and prevent the creation of unwanted artifacts that must also be removed before analysis.

The present workflow is exemplified with respect to data obtained during crosswell and inwell monitoring. However, this is exemplary only, and the invention can be broadly applied to low-frequency DAS data obtained from any aspect of oil and gas production. The following examples are intended to be illustrative only, and not unduly limit the scope of the appended claims.

For the following examples, FIG. 1 depicts cross well completion measurements. FIG. 2 depicts from cross well production. Data for FIGS. 1 & 2 were collected with Pinnacle interrogators. FIG. 3-9 shows a temporary fiber production monitoring where the low frequency DAS was collected with Optasense interrogators.

Crosswell Fracture Monitoring

The workflow was successfully applied to crosswell fracturing monitoring data acquired using a permanently installed optic fiber. Data may be acquired using a single Pinnacle DAS interrogator to collect both "noise"/high-frequency DAS and to collect temperature rate of change/low-frequency DAS. Alternatively, two DAS interrogators may be used in parallel; for example a Fotech interrogator may collect "noise"/high-frequency DAS and an Optasense may collect temperature rate of change/low-frequency DAS. All data is typically collected continuously. Further, DTS data was simultaneously collected.

The acquired crosswell injection data suffered from spike noise and low-frequency drift. Spike noise is often associated with phase errors in the interrogator and is present in all DAS acquisitions. A two-dimensional (2-D) median filter, currently used in seismic data acquisition, can mostly eliminate this type of noise while preserving the edge characteristics of the signal.

Elimination or mitigation of low-frequency drift, however, can be handled in one of two ways, depending on the type of signal being detected:
- If the desired low-frequency DAS signal is temperature-based and an independent temperature measurement is used, such as a distributed temperature sensor (DTS), which is commonly acquired simultaneously with DAS, then a joint inversion (i.e. inverse modeling techniques) can remove the drift.
- If the signal is not temperature-based, or if it is temperature based however there is not an accurate independent measurement of absolute temperature, then a search for a section of channels of the fiber at a single time that has a nonexistent, or low, signal strength is performed. Once the "quiet" section is determined for each time sample, the median of the designated channels can be used to extract a time dependent drift function. This time-dependent drift function is then subtracted from all channels at each time to remove the drift, per Equation 1.

$$\text{DRIFT}(t) = \text{MED}_x(x_q, t) \quad (1) \qquad \text{EQU. 1}$$

Here, $x_q$ is a set of quiet depth channels, t is time, $\text{MED}_x$ is a median calculation of just the channel dimension, and DRIFT(t) is the time dependent drift calculation for each time sample, t.

To test the applicability of the workflow to remove spike noise and drift, it was applied to raw low-frequency DAS data obtained from a crosswell injection and shown in FIG. 1A.

Figure 1B:
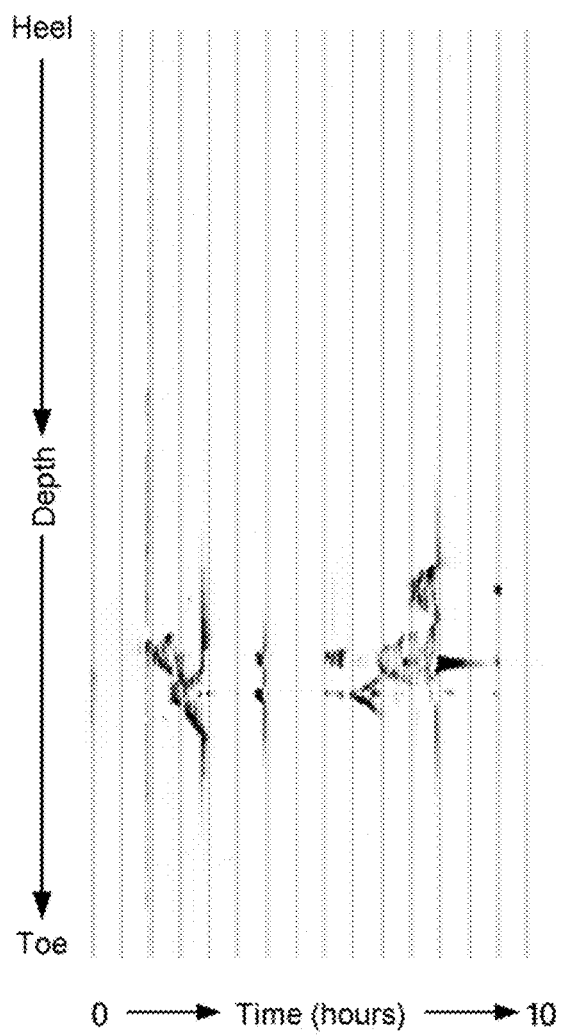
FIG. 1B is the same data after application of a median filter.

First, the workflow applied median filters to correct for the spike noise. This corrected data is shown in FIG. 1B. As can be seen, the spikes were successfully removed.

Figure 1C:
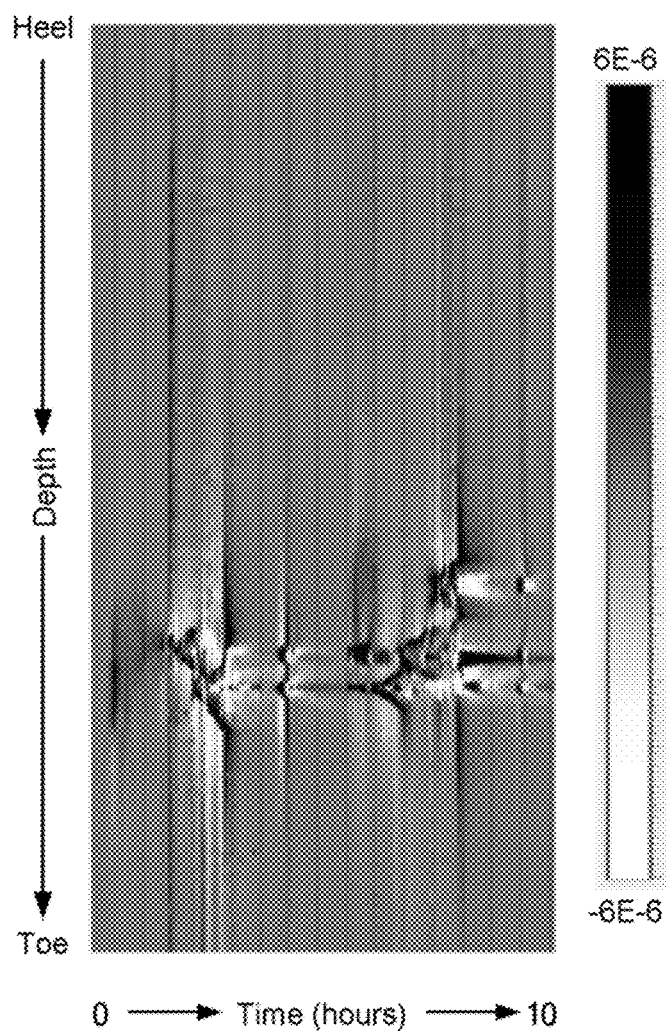
FIG. 1C is the data after application of a median filter and drift correction.

Next, a drift correction for signals that are not temperature based was applied. The results are shown in FIG. 1C.

Figure 1D:
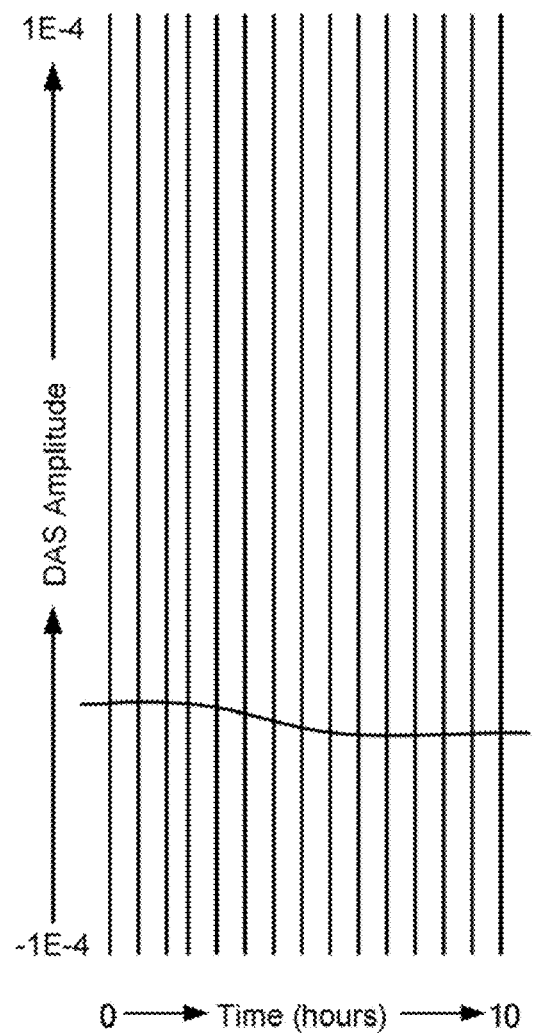
FIG. 1D is a plot of the signal drift through time.

FIG. 1D is a plot of the signal drift through time. The amplitude of the drift is higher than a large portion of the underlying signal shown in FIG. 1C. Further, the drift is about the same order of magnitude of the strong portions of the signal. If the drift is not removed, it can severely impede on the interpretability of the relevant signals.

Figures 2A, 2B:
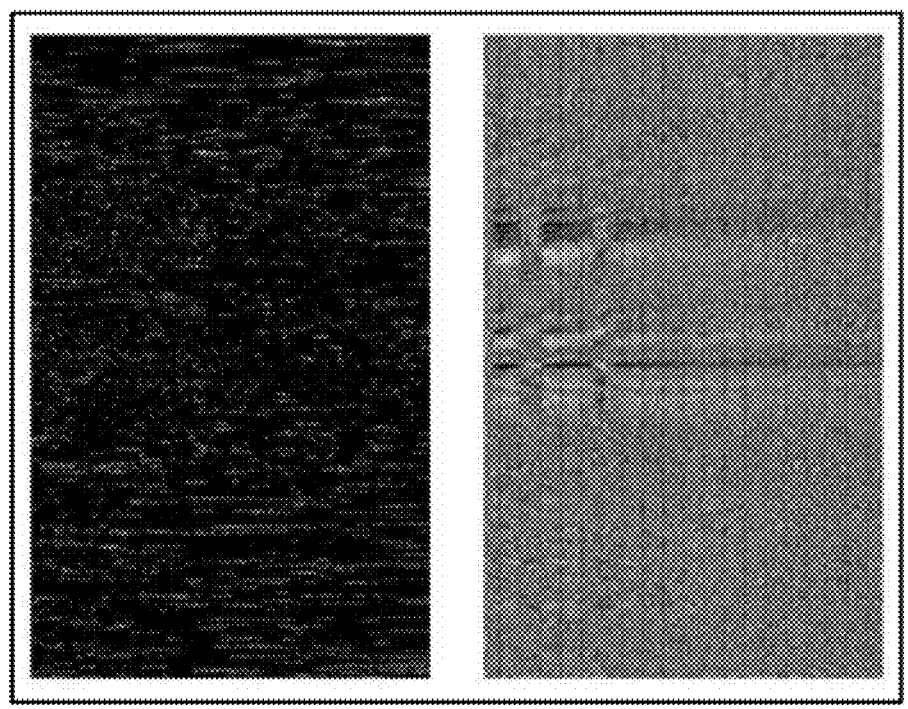
FIG. 2A displays raw LF-DAS data from crosswell production and FIG. 2B is the raw data after it has been corrected by an embodiment of the disclosed workflow.

The workflow was also applied to DAS data from production crosswell signal. The raw data, shown in FIG. 2A, was dominated by spike noise and low frequency drift. However, both were corrected by the workflow (FIG. 2B).

After processing both the injection and production crosswell signals with the described workflow, the improved data can be analyzed for information to improve the production scheme. Alternatively, the results of the analysis can be combined with the DTS data before decisions regarding the production scheme are made.

Temporarily Installed Fiber

The workflow was also applied to data obtained from temporarily installed carbon rod fibers. With temporarily installed fibers, noise associated with vibrations in the housing of the fiber in locations where the fiber is not directly coupled to the borehole are observed. Noise propagating at velocities on the order of 20,000 times faster than the fluid inside the well have been witnessed in carbon rod encased fiber acquisitions and can only be caused by a wave propagating through the carbon housing of the rod. The vibration noise is significantly stronger than any other detectable signal.

In addition to the vibration noise, other noise sources and interferences are also possible. Removal of such noise is similar to the methods described above under "Crosswell Fracture Monitoring." In some applications, the different noises must be removed in a particular order to prevent the creation of artifacts in the data. The user identifies the techniques needed and apply them in a specific order to limit creation of addition problems.

Figures 3A, 3B, 3C:
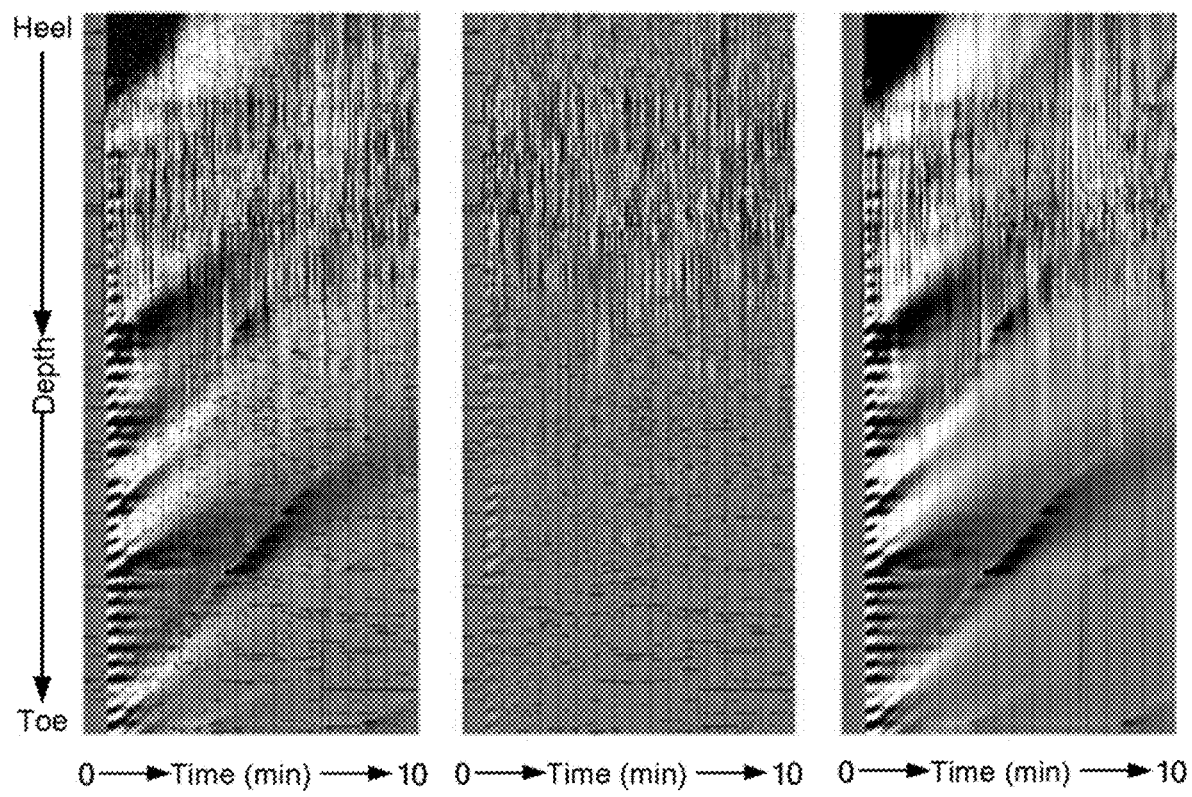
FIG. 3A displays raw data obtained from the heel quarter section of an inwell production using a temporarily installed fiber cable.
FIG. 3B displays spike noise isolated from FIG. 3A.
FIG. 3C displays the raw data of FIG. 3A after application of a median filter.

FIG. 3A displays raw data from the heel quarter section of an inwell production that was acquired with a temporarily installed carbon rod. The spike noise in this data was isolated and is displayed in FIG. 3B. Again, the workflow applied median filtering to remove the spike noise, as shown in FIG. 3C.

The vibration noise for the data shown in FIG. 3A-C can be mitigated by velocity separation with an FK filter. An FK filter is a two-dimensional Fourier transform over time and space where F is the frequency (Fourier transform over time) and K refers to wave-number (Fourier transform over space). An FK-filter is commonly applied to seismic data, but can cause large artifacts in areas where the signal does not conform to the linear characteristics of the filter.

The artifacts created with the FK filter are the reason the phase error impulse spikes must be removed first with the median filter, and an envelope soft limit may be used to threshold high amplitude noise to the amplitude of the signal. Limiting is done so that high amplitude noise that is not removed by the FK-filter is not subsequently spread out by the convolutional application of the filter.

Figure 4A:
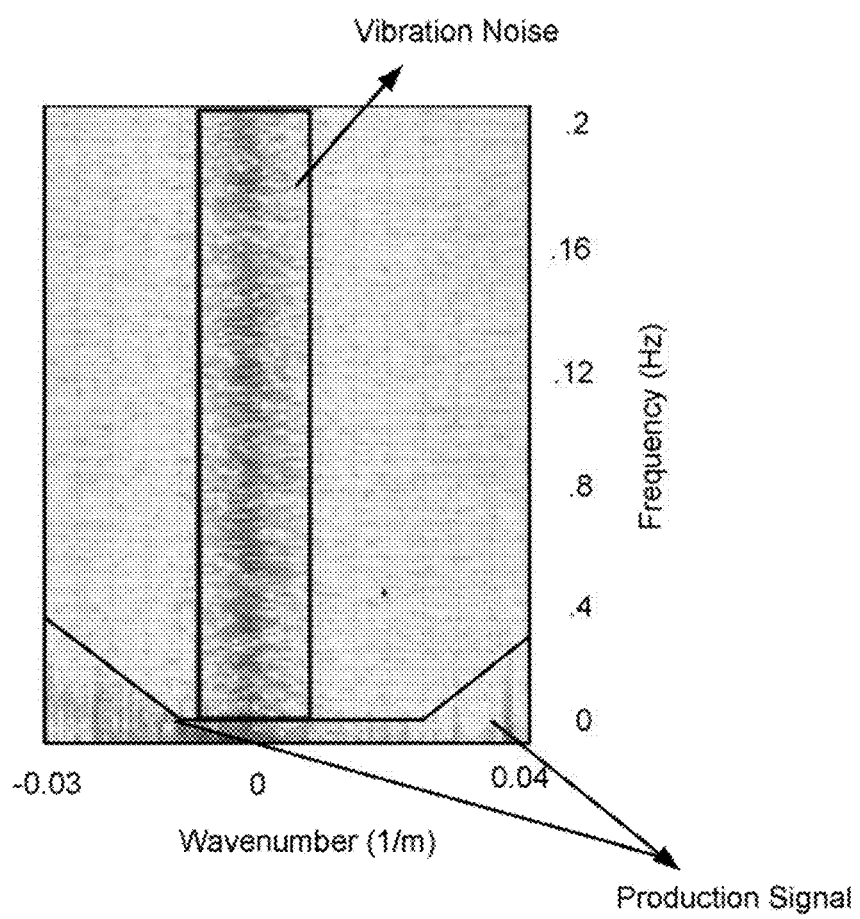
FIG. 4A displays the raw data of FIG. 3A after application of an FK Filter.
Figure 4B:
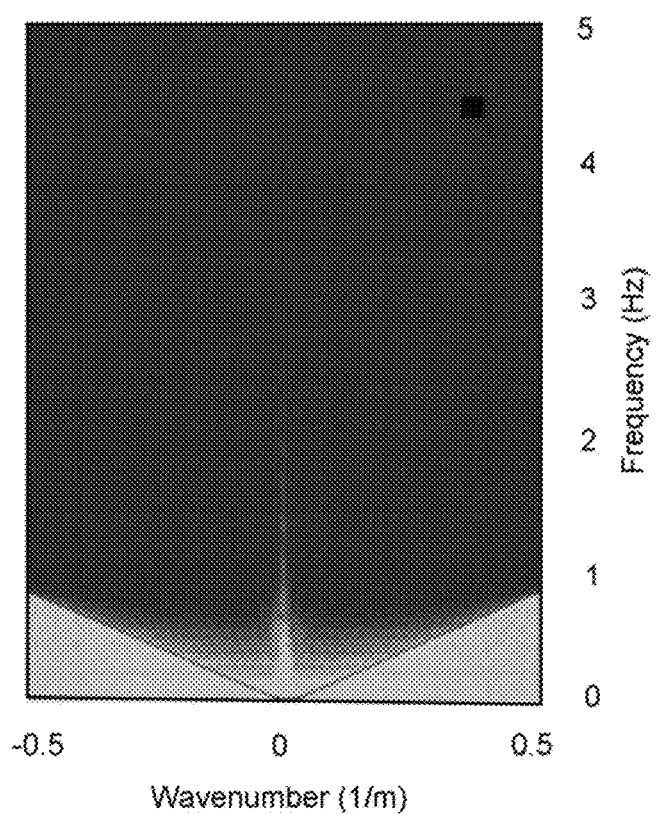
FIG. 4B displays the data after filtration with a passband filter.

An example of the FK domain of the data in FIG. 3C can be seen in FIG. 4A. The noise from the carbon rod and the production signal are marked. If a passband filter is used, then the majority of the vibration noise can be removed while the signal area is retained. FIG. 4B displays the filtered spectrum after the passband filter was applied to the data corrected by the median filter.

Figure 5A:
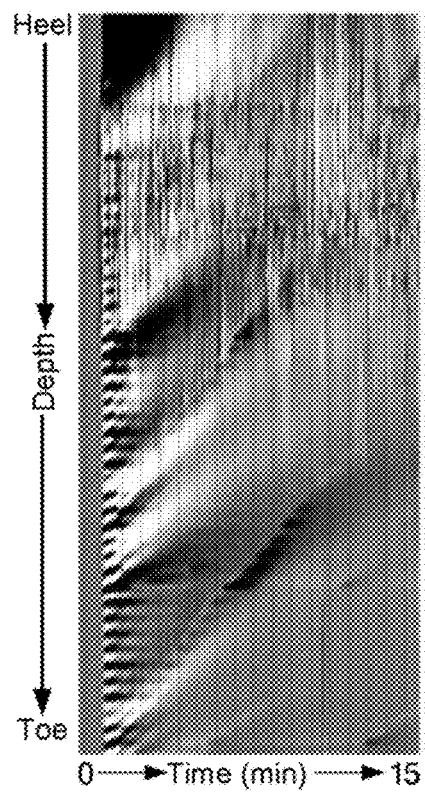
FIG. 5A displays raw production data from a temporarily installed carbon rod containing a fiber cable after application of median filtering.
Figure 5B:
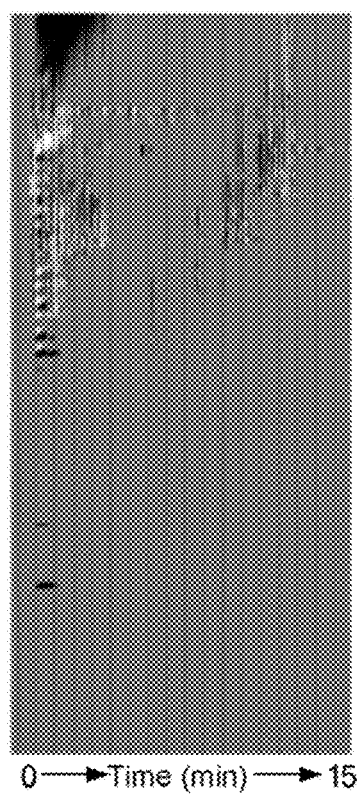
FIG. 5B shows the high amplitude noise limited by envelope soft limiting.
Figure 5C:
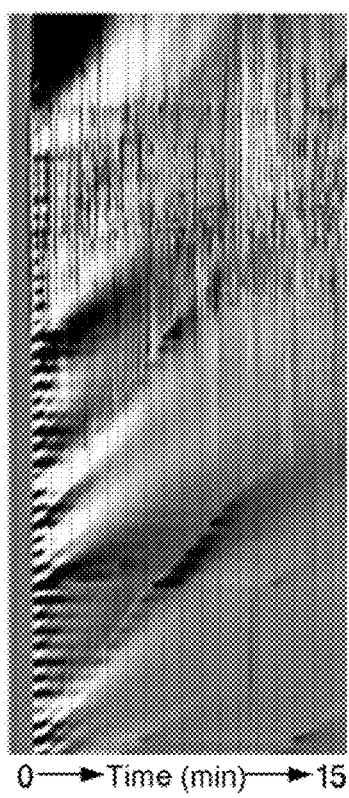
FIG. 5C shows the filtered data after application of envelope soft limiting techniques.

An example of envelope thresholding of the carbon rod acquired production data can be seen in FIG. 5A-C. FIG. 5A shows the production data after median filtering was applied to remove spike noise FIG. 5B shows the high amplitude noise isolated with envelope soft limiting. Here, the high amplitudes that are brought down to a high percentage of signal amplitude. FIG. 5C shows the filtered data after envelope soft limiting. The limiting can be seen to bring down the amplitude of the noise to about the amplitude of the signal.

FIG. 6A-D displays the corrected data (A) after envelope soft limiting, (B) filtering the noise outside the FK-filter passband, (C) the FK-Filtered data which has the carbon rod vibrations significantly mitigated, and (D) finally the data after it has been thermally recoupled and the derivative taken in the time dimension. There is now interpretable data over the entire depth range of the fiber and it is in a form that will allow for linear semblance to be calculated and used to provide velocity measurements.

Figures 7A, 7B:
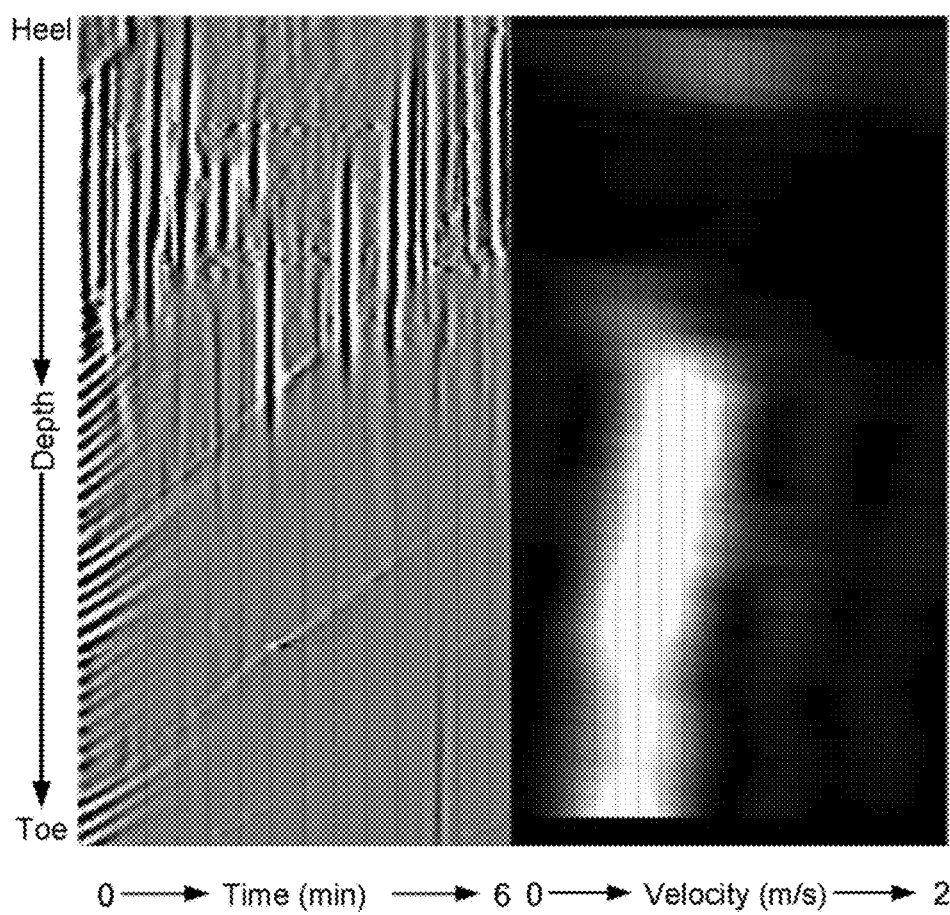
FIG. 7A-D shows the difference in the semblance calculations if the steps in FIG. 6 are and are not taken.

The advantages of using the FK-filter on the production data can be seen more clearly when the semblance is taken to calculate the velocity of the fluid in the borehole. Improving semblance leads to a continuous and relatively narrow signal for a reliable velocity estimation. FIG. 7A-B show the data semblance pair of the data from FIG. 5A without the FK-filter. The area close to the heel previously diagnosed with the vibration noise has strong noise characteristics that do not allow for a good semblance to be calculated in this same region, which can be seen from the low values in the heel section of FIG. 7B. In some instances, a reliable semblance maximum cannot be determined and no reliable velocity can be estimated for these depth locations. After the semblance calculation, there is still an inability to pick velocities in the heel section.

Figures 7C, 7D:
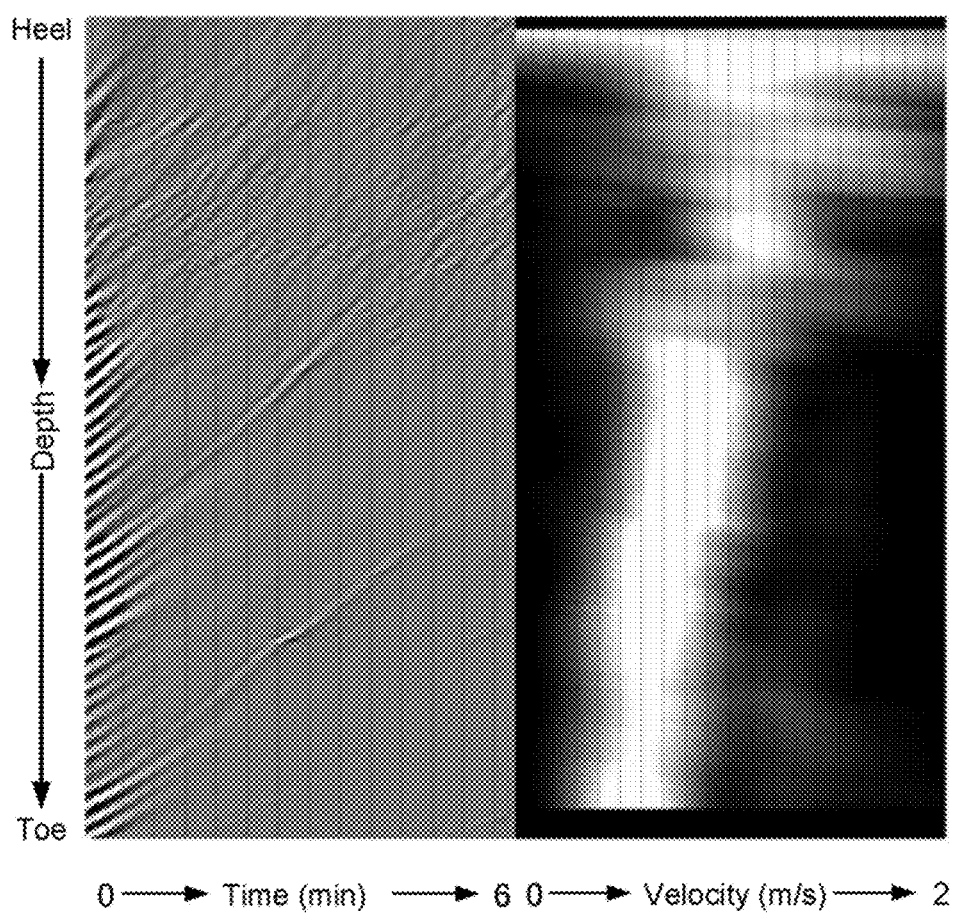

To further improve the signal, an FK-filter can be applied. In FIG. 7C, signal towards the heel is still degraded by the noise once the FK-filter is used, but the area in FIG. 7B that lacked a trackable semblance, has been filled in, as seen in FIG. 7D. Thus, the noise has been dropped enough to allow for an estimation of the velocities in the heel section.

If the desired signal is temperature-based, and the fiber is not directly in the medium that needs to be measured, i.e. fluid in a wellbore, then any temperature diffusion effects would need to be removed. The temperature diffusion effect is based on the material that is between the fiber and the measured substance. Thermal recoupling allows for the known thermal diffusion response of the interface between fiber and measurement material to be deconvolved out of the response signal to more accurately measure the temperature of the desired material.

Figures 6A, 6B:
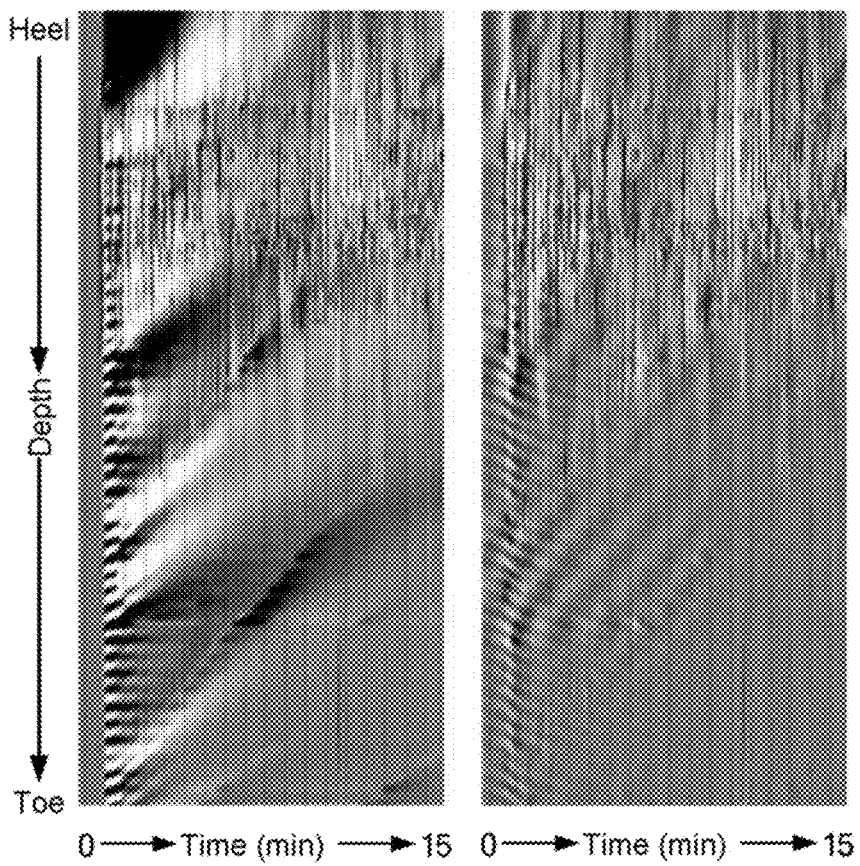
FIG. 6A-D displays the raw data in FIG. 5A after application of envelope soft limiting (FIG. 6A), filtering the noise outside the FK-filter passband (FIG. 6B), the FK-Filtered data which has the carbon rod vibrations significantly mitigated by eliminating events propagating at velocities above interesting production velocities using an FK-Filter (FIG. 6C), and after the data has been thermally recoupled and the derivative taken in the time dimension (FIG. 6D).
Figures 6C, 6D:
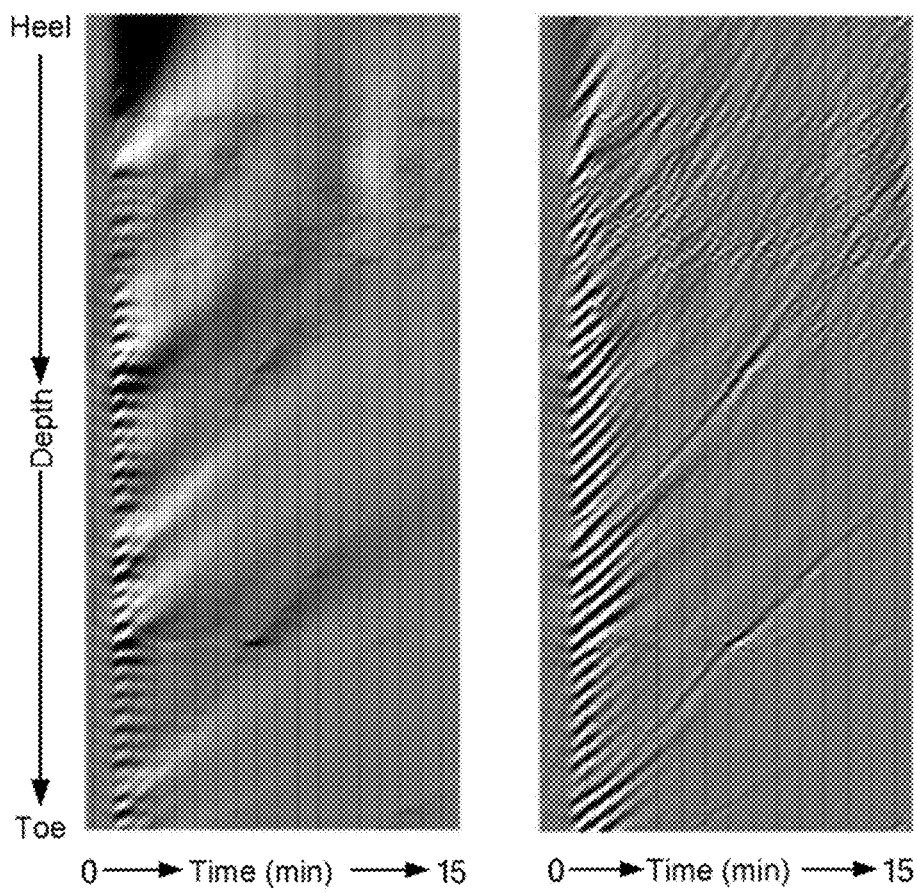

FIG. 6D shows the results of thermal recouple on the data acquired with a carbon rod for production. In making an operational decision based on this data, the parameters that need to be selected are associated with the interface between the fiber and the borehole fluid, which is achieved by changing the diffusivity term in the equation. An example of the affect of thermal recoupling on the data quality, as well as the semblance velocity calculations (i.e. diffusivity term), can be seen in FIG. 8A-F.

Figures 8A, 8B:
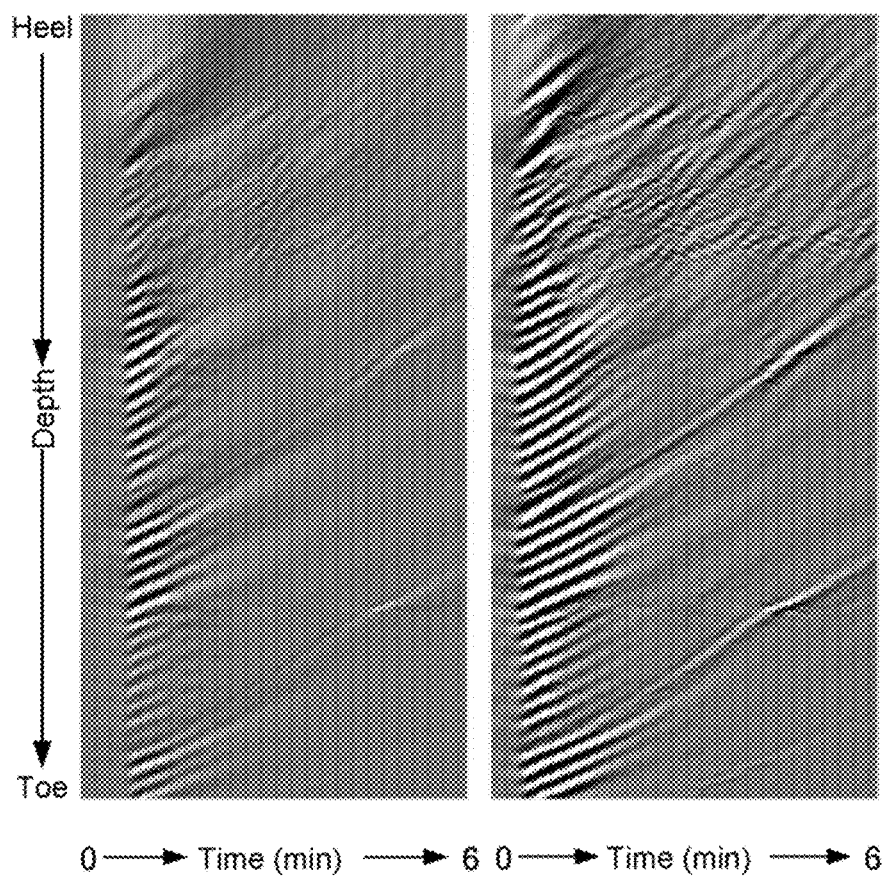
FIG. 8A-B displays production data from a temporarily installed carbon rod containing a fiber cable before thermal recoupling (FIG. 8A) and after thermal recoupling (FIG. 8B).
Figures 8C, 8D, 8E, 8F:
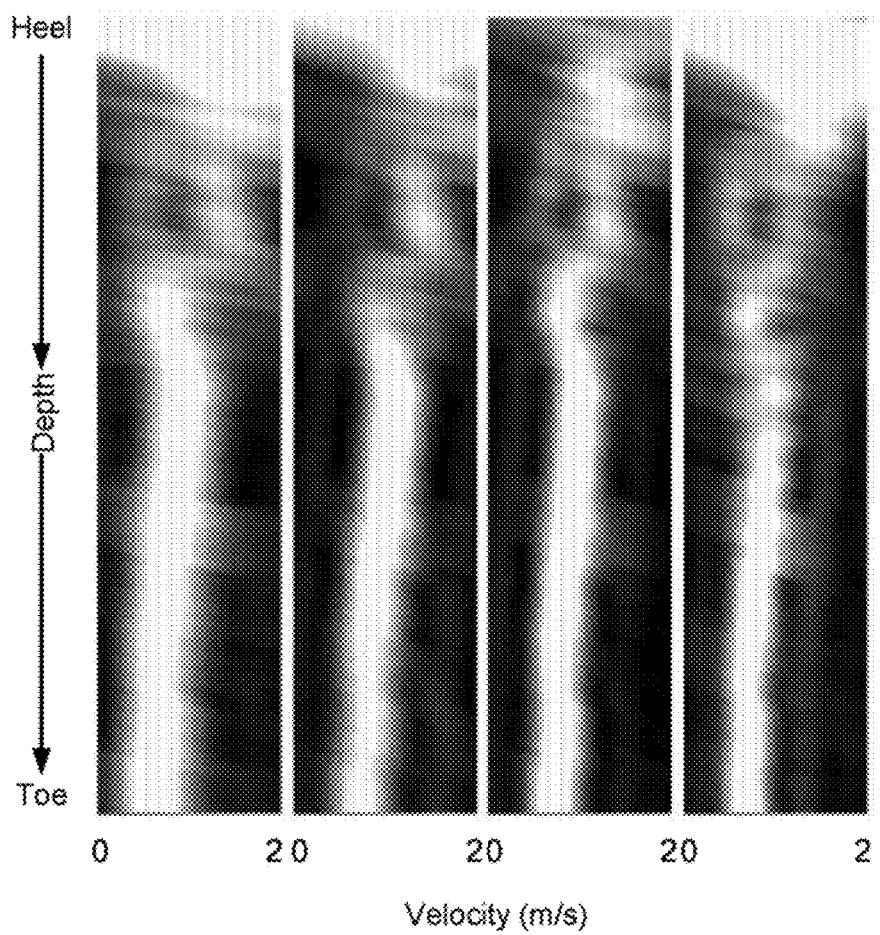
FIG. 8C displays the production data after semblance calculation without thermal recoupling.
FIG. 8D-8F displays the semblance calculations after thermal recoupling with various diffusivity settings.

FIG. 8A is the DAS production data that has not been thermally recoupled and FIG. 8B shows the results after thermal recoupling. FIG. 8C is the data in FIG. 8A with the semblance but no thermal recoupling. FIG. 8D shows the result with a diffusivity of $1.0 \times 10^{\wedge}(6 \text{ ft}^2/\text{s})$. FIG. 8E displays the optimal diffusivity of $2.0 \times 10^{\wedge}(6 \text{ ft}^2/\text{s})$ and FIG. 8F shows the result with diffusivity of $4.3 \times 10^{\wedge}(6 \text{ ft}^2/\text{s})$. Thermal diffusivity, a, may be computed from:

$$k/(\rho C)$$

where k is the thermal conductivity of either the cement or carbon rod in (Watts/ft degree), $\rho$ is the density of this material (kg/ft$^3$), and C is its heat capacity in (Joules/kg degree), or any other set of compatible units. The nominal value of $4.3 \times 10^{-6}$ ft$^2$/s was computed from properties of the rod which were furnished from its manufacturer.

Of the four semblance options, the one with no recoupling, FIG. 8C, has the widest semblance distribution, and thus has the highest uncertainty for velocity calculation. The option with the best, most compact and continuous semblance is the recoupling with diffusivity parameter $2.0 \times 10^{-6}$ ft$^2$/s in FIG. 8E.

Automatic gain control (AGC) has been applied to fainter portions of a given trace of seismic data so that the average amplitude of the trace is more close to constant, so as to enable more efficient analysis. However, for the DAS signal, AGC can be applied only if the amplitude of the signal is not used in the analysis. This is typically the situation when the travel time move out characteristics are important. The automatic gain control will minimize the overall variability of the signal strength along the wellbore, and obtain a consistent and reliable velocity estimation using thermal signal move outs.

The improved signal can then be combined with DTS signals or used alone as a snapshot of the well.

Bakken Formation

The workflow was also applied to data gather in three ongoing projects in the Bakken formation to monitor flowrate distribution of hydrocabons. DAS, DTS and pressure and temperature (P/T) gauge data was collected for Projects A and B to support future decisions on completion design for one or more Bakken assets. Project C collected the data to measure fracturing cluster efficiency and to interpret production profile for each well fractured.

In practice, the wells were shut in to build up spatial temperature variation. Then, they were opened to create a temperature signal that moves through the wellbore called a temperature slug. As the temperature slug (an increase or decrease in temperature) moves though the wellbore it may be tracked. DAS low-frequency signal is very sensitive to the small temperature variations inside the well bore, up to ($10^-5$ F/s). By analyzing the low-frequency DAS signal during well opening events, the distributed velocity profile can be measured. However, transient flow, which is observed after well openings, diminishes with time, and the ability for DAS to record the signal diminishes. Thus, the data was continuously acquired and processed to determine the flowrate distribution.

Figure 9:
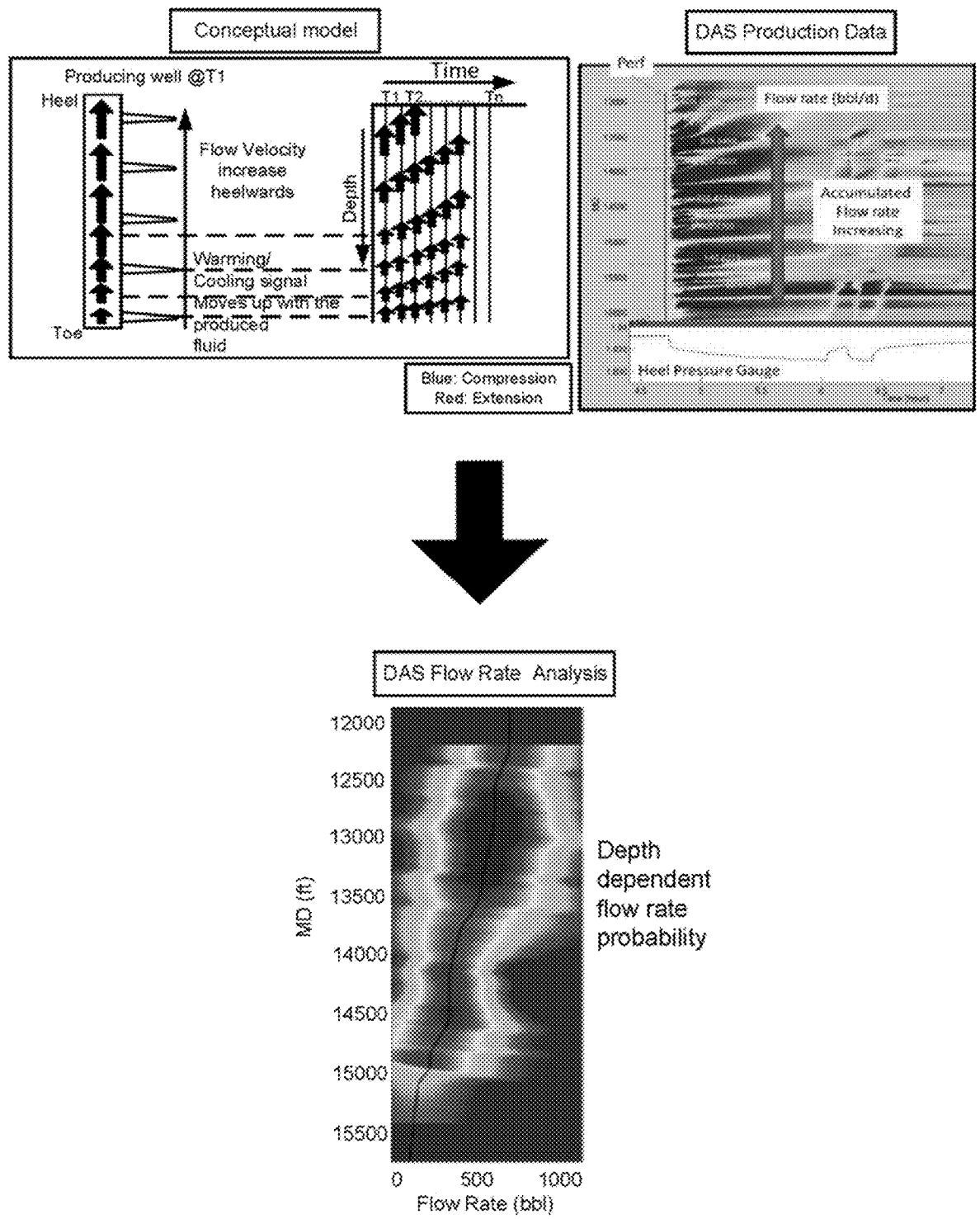
FIG. 9. Conceptual model of data collection for a well in the Bakken reservoir.

A conceptual model of how the LF-DAS was used to determine flowrate is shown in FIG. 9. After shutting in the well, about 1-2 degrees of spatial temperature variation will start to build up in the borehole, as demonstrated by the blue and red arrows here. Once the well is opened and flowback begins, for a short period of time, the temperature variations create temperature slugs that travel along the borehole at the flow rate, as shown.

In a time-depth plot, the slope of the temperature slug moveout indicates how fast it travels, so we can get flow rate information from the slug moveout. The magnitude of these temperature slugs is very small and are not detectable by DTS. However, LF-DAS is very sensitive to temperature variation, which allows for measurements of temperature change as small as $10^-5$ F/s.

A snippet of the low-frequency DAS response from one of the wells is shown in FIG. 9. The red and blue areas indicate warming and cooling signals. From heel to toe, the signal has different moveout, which is flatter at the toe and steeper at the heel. After some processing, the DAS temperature response can be converted into a map of flow rate probabilities, which is shown on the far right panel. Warmer color indicating higher probability of flowrate at a certain depth.

Figure 10:
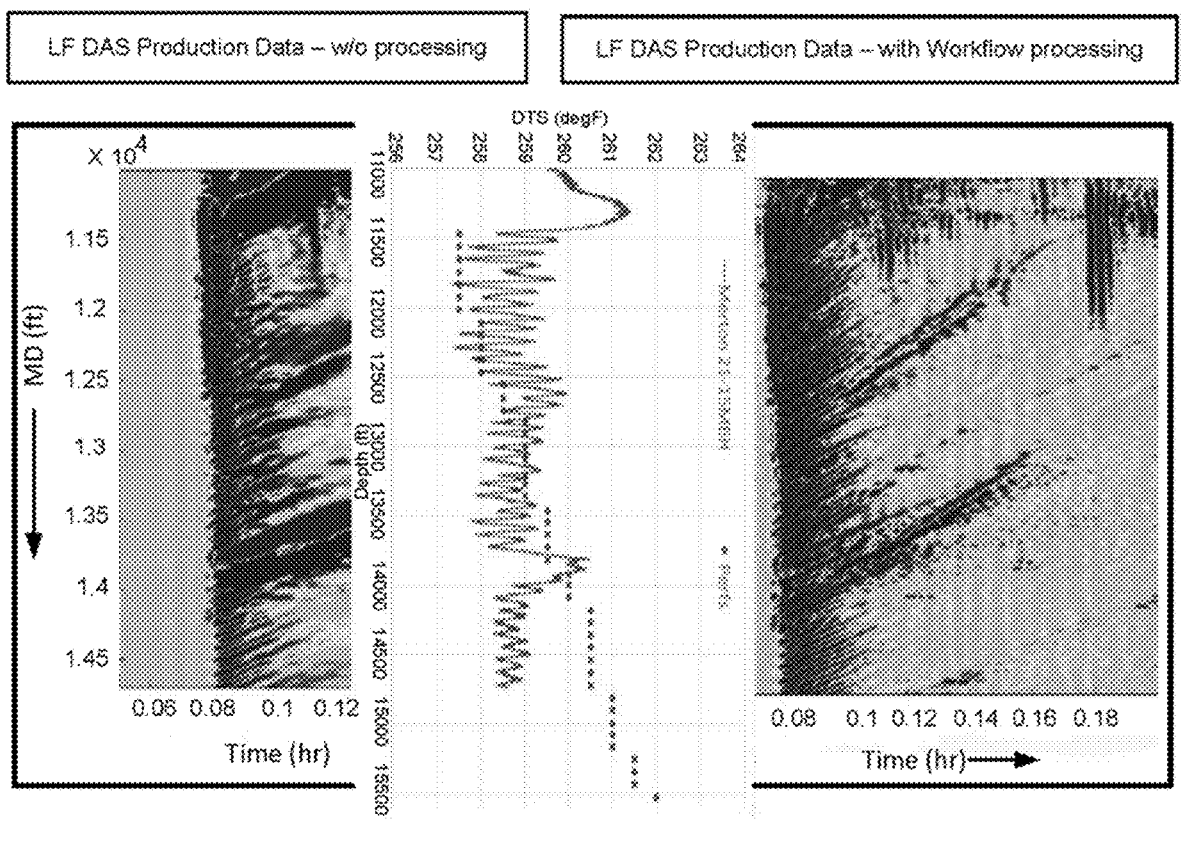
FIG. 10. Analysis of DAS production data a well in the Bakken reservoir.
Figure 10:
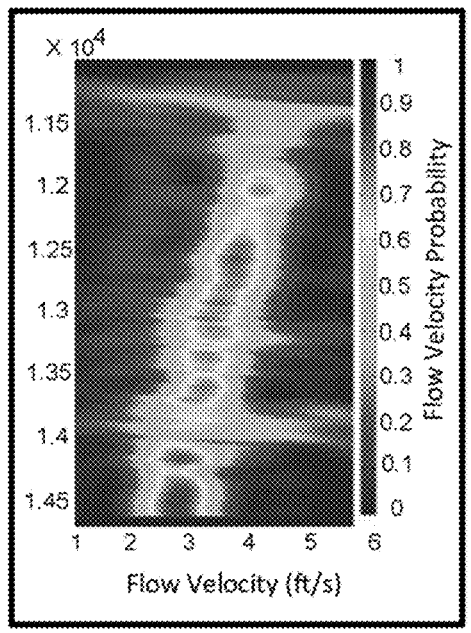

FIG. 10 displays the LF-DAS production data after the third opening of Well 1 in Project A, both before and after application of the Workflow. After the signal-to-noise ratio is increased and the noise is removed, the temperature slug is clearly distinguishable. Thus, the workflow improves the acquired data and allows for important information to be distinguished from the interferences.

The information provided by the LF-DAS signals can be utilized in modeling stimulations for like reservoirs or for optimizing the current stimulation plan. For instance, the proppant concentration can be increased at a quicker rate to open new fractures sooner in the fracturing process or the injection of fluids can be extended to grow new fractures. Although hydraulic fracturing is quite successful, even incremental improvements in technology can mean the difference between cost effective production and reserves that are uneconomical to produce. Thus, it is imperative that the noise signal and other interferences are removed from the LF-DAS signal using the described workflow.

Finally, there are limitations to using the DAS measurements. The flow rate can only be measured during the transient period because DAS measures the temperature change, not the absolute temperature. After flowing the well for a period of time, the borehole temperature reaches equilibrium so the DAS response will vanish. Also, in order to measure velocity precisely, we need a certain distance, which limits the spatial resolution. However, the improvement in signal-to-noise ratio makes up for these limitations.

The following references are incorporated by reference in their entirety:

Boone, Kevin, et al. "Monitoring Hydraulic Fracturing Operations Using Fiber-Optic Distributed Acoustic Sensing." Unconventional Resources Technology Conference, San Antonio, Tex., 20-22 Jul. 2015. Society of Exploration Geophysicists, American Association of Petroleum Geologists, Society of Petroleum Engineers, 2015.

Webster, P., et al. "Micro-Seismic detection using distributed acoustic sensing." SEG Technical Program Expanded Abstracts 2013. Society of Exploration Geophysicists, 2013. 2459-2463.

Paleja, Rakesh, et al. "Velocity Tracking for Flow Monitoring and Production Profiling Using Distributed Acoustic Sensing." SPE Annual Technical Conference and Exhibition. Society of Petroleum Engineers, 2015.

US20140358444, "Method of Hydraulic Fracture Identification Using Temperature"

U.S. Pat. No. 10,095,828, "Production Logs from distributed acoustic sensors," filed Mar. 8, 2017.

U.S. Pat. No. 10,287,874, "Hydraulic fracture monitoring by low-frequency DAS," filed Mar. 8, 2017.

U.S. Pat. No. 10,370,957, "Measuring downhole temperature by combining DAS/DTS data," filed Mar. 8, 2017.

U.S. 2017-0260842, "Low Frequency Distributed Acoustic Sensing," filed Mar. 8, 2017.

U.S. 2017-0260839, "DAS for well ranging," filed Mar. 8, 2017.

U.S. 2017-0260849, "DAS method of estimating fluid distribution," filed Mar. 8, 2017.

The invention claimed is:

1. A method of optimizing production of a hydrocarbon-containing reservoir comprising:
    a) collecting Low-Frequency Distributed Acoustic Sensing (LF-DAS) data from at least one well in a hydrocarbon-containing reservoir comprising:
        i) recording one or more reflected datasets;
        ii) converting said one or more reflected datasets into a continuous record;
        iii) transforming the continuous record with a low-pass filter transform with a range of greater than 0 to 50 millihertz (mHz) to provide a transformed record;
        iv) down sampling the transformed record;
        v) interpreting the down-sampled transformed record to provide LF-DAS data;
    b) applying at least one processing technique to said LF-DAS data to form a corrected data set
    c) analyzing said corrected data set; and,
    d) optimizing a production plan for producing hydrocarbons from said reservoir based on said analysis; and
    e) implementing said optimized production plan to produce hydrocarbons.

2. The method of claim 1, wherein said processing technique is selected from a group comprising median filtering, drift removal, envelope soft limiting, FK filtering, thermal decoupling, dynamic fluid correction, temporal derivatives, and/or amplitude gain control.

3. The method of claim 1, wherein step c) further comprises analyzing the corrected data set in combination with at least one of distributed temperature sensor (DTS) measurements, pressure gauge data, and/or microseismic data.

4. A method of optimizing the production of a hydrocarbon-containing reservoir comprising:
    a) collecting Low-Frequency Distributed Acoustic Sensing (LF-DAS) data from at least one well in a hydrocarbon-containing reservoir comprising:
        i) recording one or more reflected datasets;
        ii) converting said one or more reflected datasets into a continuous record;
        iii) transforming the continuous record with a low-pass filter transform with a range of greater than 0 to 50 millihertz (mHz) to provide a transformed record;
        iv) down sampling the transformed record;
        v) interpreting the down-sampled transformed record to provide LF-DAS data;

b) applying at least one processing technique to said LF-DAS data to form a corrected data set, wherein said processing technique is selected from a group comprising median filtering, drift removal, envelope soft limiting, FK filtering, thermal decoupling, dynamic fluid correction, temporal derivatives, and/or amplitude gain control;

c) analyzing said corrected data set; and, d) optimizing production of hydrocarbon from said reservoir based on said analysis.

5. A method of optimizing production from a hydrocarbon-containing reservoir comprising:

a) installing one or more fiber optic cables in at least one wellbore in a hydrocarbon-containing reservoir;

b) attaching said fiber optic cables to an interrogator having interrogation recording functions;

c) producing hydrocarbon from a target zone in said at least one wellbore using a predetermined parameters of a production scheme;

d) interrogating at least one fiber optic cable with an interrogation signal during step c);

e) collecting Low-Frequency Distributed Acoustic Sensing (LF-DAS) data from at least one wellbore comprising:
  i) recording one or more reflected datasets;
  ii) converting said one or more reflected datasets into a continuous record;
  iii) transforming the continuous record with a low-pass filter transform with a range of greater than 0 to 50 millihertz (mHz) to provide a transformed record;
  iv) down sampling the transformed record;
  i) interpreting the down-sampled transformed record to provide an interpreted record;

f) optimizing said predetermined parameters of said production scheme using said interpreted record to provide optimized parameters; and, g) using said optimized parameters for producing hydrocarbon from a subsequent zone of said wellbore.

6. The method of claim 5, wherein said one or more fiber optic cables are temporarily installed.

7. The method of claim 5, wherein said one or more fiber optic cables are permanently installed.

8. The method of claim 5, wherein said one or more fiber optic cables are temporarily and/or permanently installed.

9. The method of claim 5, wherein said LF-DAS is corrected with a processing technique selected from a group comprising median filtering, drift removal, envelope soft limiting, FK filtering, thermal recoupling, dynamic fluid correction, temporal derivatives, and/or amplitude gain control.

10. The method of claim 5, wherein step c) further comprises analyzing the corrected data set in combination with at least one of distributed temperature sensor (DTS) measurements, pressure gauge data, and/or microseismic data.

11. A method of optimizing a hydraulic fracturing stimulation of a reservoir comprising:

a) installing one or more fiber optic cables in at least one wellbore;

b) attaching said fiber optic cables to an interrogator having interrogation and reflection recording functions;

c) fracturing a stage of a multistage hydraulic fracturing stimulation in a reservoir using pre-determined parameters;

d) interrogating at least one fiber optic cable with an interrogation signal during step c);

e) recording one or more Low-Frequency Distributed Acoustic Sensing (LF-DAS) datasets comprising:
  i) recording one or more reflected datasets;
  ii) converting said one or more reflected datasets into a continuous record;
  iii) transforming the continuous record with a low-pass filter transform with a range of greater than 0 to 50 millihertz (mHz) to provide a transformed record;
  iv) down sampling the transformed record;
  i) interpreting the down-sampled transformed record to provide an interpreted record;

f) optimizing said pre-determined parameters of said hydraulic fracturing stimulation using said interpreted record to provide optimized parameters; and, g) using said optimized parameters for fracturing a subsequent stage in said reservoir.

12. The method of claim 11, wherein said one or more fiber optic cables are temporarily installed.

13. The method of claim 11, wherein said LF-DAS is corrected with a processing technique selected from a group comprising median filtering, drift removal, envelope soft limiting, FK filtering, thermal recoupling, dynamic fluid correction, temporal derivatives, and/or amplitude gain control.

14. The method of claim 11, wherein step c) further comprises analyzing the corrected data set in combination with at least one of distributed temperature sensor (DTS) measurements, pressure gauge data, and/or microseismic data.

* * * * *